United States Patent
Cockerill et al.

(10) Patent No.: US 12,348,115 B2
(45) Date of Patent: Jul. 1, 2025

(54) LINEAR ELECTRICAL MACHINE

(71) Applicant: LIBERTINE FPE LTD, York (GB)

(72) Inventors: Samuel Cockerill, York (GB); Edward Haynes, Sheffield (GB)

(73) Assignee: LIBERTINE FPE LTD, York (GB)

( * ) Notice: Subject to any disclaimer, the term of this patent is extended or adjusted under 35 U.S.C. 154(b) by 0 days.

(21) Appl. No.: 17/420,479

(22) PCT Filed: Jan. 3, 2020

(86) PCT No.: PCT/GB2020/050006
§ 371 (c)(1),
(2) Date: Jul. 2, 2021

(87) PCT Pub. No.: WO2020/141324
PCT Pub. Date: Jul. 9, 2020

(65) Prior Publication Data
US 2022/0085694 A1  Mar. 17, 2022

(30) Foreign Application Priority Data

Jan. 4, 2019 (GB) ...................................... 1900115

(51) Int. Cl.
*H02K 7/18* (2006.01)
*F01B 11/00* (2006.01)
(52) U.S. Cl.
CPC .......... *H02K 7/1884* (2013.01); *F01B 11/003* (2013.01)
(58) Field of Classification Search
CPC ....... F01B 11/00; F01B 11/001; F01B 11/002; F01B 11/003; F02B 63/041;
(Continued)

(56) References Cited

U.S. PATENT DOCUMENTS

| 4,349,757 A * | 9/1982 | Bhate .................... H02K 35/02 310/15 |
| 2008/0271711 A1 | 11/2008 | Cheeseman |

(Continued)

FOREIGN PATENT DOCUMENTS

| CN | 107735350 | 2/2018 |
| DE | 102015122794 | 6/2017 |

(Continued)

OTHER PUBLICATIONS

Combined Search and Examination Report for UK Patent Application No. GB1900115.5, mailed Jul. 5, 2019.

(Continued)

*Primary Examiner* — Tulsidas C Patel
*Assistant Examiner* — Joshua Kiel M Rodriguez
(74) *Attorney, Agent, or Firm* — Andrus Intellectual Property Law, LLP

(57) ABSTRACT

A linear electrical machine (LEM) comprising: at least one stator mounted in a housing, the housing and stator defining a working cylinder; a two-section central core within the working cylinder, wherein the two sections of the core are co-axial, separate and cantilever mounted within the working cylinder, a cylindrical stator bore cavity between the working cylinder and the two central core sections; and one or more hollow translators, each translator being axially movable within the stator bore cavity, such that each section of the central core is traversed by part of the one or more translators, thereby forming an exterior magnetic circuit airgap between the respective translator and stator.

21 Claims, 22 Drawing Sheets

Section A – A

(58) Field of Classification Search
CPC .. H02K 7/1869; H02K 7/1876; H02K 7/1884; H02K 35/00; H02K 35/02; H02K 41/02
See application file for complete search history.

(56) References Cited

U.S. PATENT DOCUMENTS

| | | | | |
|---|---|---|---|---|
| 2010/0187026 | A1* | 7/2010 | Knoblauch | B60K 1/02 180/65.1 |
| 2018/0105396 | A1* | 4/2018 | Purosto | B66B 11/0407 |
| 2018/0298814 | A1* | 10/2018 | Simpson | F02B 71/00 |

FOREIGN PATENT DOCUMENTS

| | | | |
|---|---|---|---|
| DE | 102016120354 | | 4/2018 |
| EP | 2224580 | | 9/2010 |
| EP | 2224580 | A2 * 9/2010 | ............ F02B 71/06 |
| GB | 2494217 | | 3/2013 |
| GB | 2555752 | | 5/2018 |
| GB | 2558677 | | 7/2018 |
| JP | 2014117149 | A | 6/2014 |
| WO | 2016207136 | | 12/2016 |
| WO | 2018142137 | A1 | 8/2018 |

OTHER PUBLICATIONS

International Search Report and Written Opinion for International Patent Application No. PCT/GB2020/050006, mailed Mar. 17, 2020.
Examination Report Under Sections 12 & 13 of the Patents Act, 1970 and the Patents Rules, 2003, for Indian Patent Application No. 202127029224, dated Jan. 16, 2023.
Examination Report for Chinese Patent Application No. 202080018694.5, published Jun. 22, 2023.
Office Action for Japanese Patent Application No. 2021-538951, dated Jan. 9, 2024.
Communication Pursuant to Article 94(3) EPC for EP Patent Appl. No. 207003146, dated Jan. 31, 2025

* cited by examiner

Section A – A

Section B - B

Section B - B

Enlarged section B - B

Section C - C

Section C - C

Section B - B

Section B - B

Section B - B

Enlarged section B - B

Enlarged section B - B

Section B - B

Section B - B

Section B - B

Section B - B

Section B - B

Section B - B

LINEAR ELECTRICAL MACHINE

CROSS-REFERENCE TO RELATED APPLICATIONS

This application is the U.S. national stage application of International Application PCT/GB2020/050006, filed Jan. 3, 2020, which international application was published on Jul. 9, 2020, as International Publication WO 2020/141324 in the English language. The international application is incorporated herein by reference, in entirety. The international application claims priority to GB Patent Application No. 1900115.5, filed Jan. 4, 2019, which is incorporated herein by reference, in entirety.

This invention relates to a linear electrical machine.

Such linear electrical machines can be used in various applications including, but not limited to, use as a free piston engine linear generator where combustion pressure acts upon a translator to produce useful electrical power output, use as a gas expander where a high pressure gas acts upon a translator to produce useful electrical power output, use as a gas compressor where an electrical input induces movement in a translator to pressurise a gas, use in hydraulic systems where movement of the translator causes or is caused by displacement of hydraulic fluid within a working chamber, and use as an actuator where an electrical input induces movement in a translator to produce a desired actuation effect.

Such actuators can be used in displacement and vibration test systems, manufacturing operations and robotics. In displacement and vibration test system applications, the actuator may be used to apply a cyclic force or motion profile to a test subject. The test subject could be a material sample, a discrete component, a sub-system assembly of components or a complete product. The purpose of such testing may be to determine the durability of the test subject to the applied force or displacement function. Alternatively, testing may seek to characterise the response of the test subject to the applied force or displacement function.

The automotive industry makes widespread use of such test actuators for sub-assembly testing and complete product testing. The test actuator is typically arranged to support a vehicle or part of a vehicle such as one of more wheels or suspension parts.

In particular, in a vehicle testing application, the invention may be utilised as part of a road simulator vehicle test system in which each corner of a vehicle is typically supported on a separate actuator. The support may be provided directly to the wheels of the vehicle or may be provided to other components such as a suspension part, a stub axle or supporting arms. Actuators could be applied to the body of the vehicle in certain situations. Motion of the actuators can then simulate movement of the vehicle over various road surfaces and other terrain. The testing environment is therefore a controlled one in which force or displacement input functions representing different driving speeds and road surface conditions can be applied to the vehicle. As examples, by varying the amplitude of a high frequency displacement, rougher or smoother road surface can be simulated. Alternatively, extreme loads can be applied to simulate pot holes and other larger features in the road. Such testing can be used in vehicle development to reduce driving noise and ensure the vehicle suspension components are sufficiently capable and durable for the intended range of driving conditions.

In order to simulate the high frequency displacements that characterise road loads at representative driving speeds, servo-hydraulic systems are commonly used as a basis for automotive test systems. In these systems, a servo-hydraulic power pack generates high pressure hydraulic fluid which is then fed to hydraulic actuators using one or more servo-valves. These systems suffer from a number of well-known drawbacks.

Firstly, the inertia of the hydraulic oil and servo-hydraulic power pack components limits the practical frequency of road load functions that can be generated to approximately 150 Hz. This is far below the level of performance necessary to accurately represent road surface roughness which is characterised by features at the scale of 20 mm and less, and is also below the input vibration frequencies known to excite resonances in the structure of the vehicles which in turn produce undesirable cabin noise.

Secondly, servo-hydraulic systems require expensive and dedicated infrastructure within the test facility which can be extremely bulky, and yet which must be located relatively close to the hydraulic actuators to limit the inertia of oil moving within the system. In addition, this infrastructure requires specialist operation and maintenance expertise.

Thirdly, servo-hydraulic systems are large consumers of power, making them expensive to operate and contributing to the carbon emissions footprint of automotive development and manufacture.

Fourthly, servo-hydraulic systems can be extremely noisy, making it difficult to differentiate between noise produced due to the response of the test subject and the associated noise of the test actuator system itself.

As a result of these drawbacks, linear electromagnetic actuators are being adopted in place of servo-hydraulic systems for certain automotive testing applications and other test actuator applications. Linear electromagnetic actuators have the advantages of being more responsive, more compact. easier to operate and maintain, more efficient and less noisy.

In several such systems, a spring and/or pneumatic cylinder are provided to enable the actuators described in prior art to apply a static load through or alongside the electrical machine translator and into the test subject. This arrangement permits the actuator's fixed force component to be adjusted prior to operation in order to balance the test subject weight and/or to ensure the test subject is in the correct position prior to the start of testing.

U.S. Pat. No. 7,401,520 teaches a complete system for testing a vehicle comprising a plurality of apparatus, each of the plurality of apparatus comprising a frame for supporting at least a portion of a wheel of a vehicle and a linear electromagnetic actuator at least partially contained within the frame, the linear electromagnetic actuator having a movable magnet and in use imparting a controlled substantially vertical force to a vehicle wheel. Each of the apparatus is arranged to independently impart controlled substantially vertical force on a corresponding one of a plurality of supported vehicle wheels and a plurality of air springs (which are sometimes referred to as airbags) or alternatively mechanical springs (from the group comprising a coil spring, a torsional spring and a leaf spring) are provided to provide levelling of a supported vehicle.

Such a system suffers from a number of drawbacks.

Firstly, the requirement for a load-bearing mechanical connection between the airbag or mechanical spring and the wheel plate or electrical machine mover adds inertial mass to the moving assembly. This additional inertia reduces the peak frequencies that the actuator is capable of achieving for a given displacement.

Secondly, the use of a compliant member such as an airbag or mechanical spring introduces the possibility of undesirable resonances being generated in the test actuator system, compromising the integrity of the input function that is applied to the test subject.

Thirdly, the arrangement taught by U.S. Pat. No. 7,401, 520 requires an unnecessary level of complexity in construction due to the need to couple discrete spring and electrical machine assemblies within each actuator test frame, resulting in increased cost and size of the overall device.

U.S. Pat. No. 8,844,345 teaches an apparatus that imparts motion to a test object such as a motor vehicle in a controlled fashion. A base has mounted on it a linear electromagnetic motor having a first end and a second end, the first end being connected to the base. A pneumatic cylinder and piston combination have a first end and a second end, the first end connected to the base so that the pneumatic cylinder and piston combination is generally parallel with the linear electromagnetic motor. The second ends of the linear electromagnetic motor and pneumatic cylinder and piston combination being commonly linked to a movable member which is additionally attached to a mount for the test object. A control system for the linear electromagnetic motor and pneumatic cylinder and piston combination drives the pneumatic cylinder and piston combination to support a substantial static load of the test object and the linear electromagnetic motor to impart controlled motion to the test object.

Such a system suffers from a number of drawbacks similar to those previously described in relation to U.S. Pat. No. 7,401,520.

Firstly, the requirement for a discrete pneumatic cylinder and piston combination, a load bearing movable member and mount for a test subject adds considerable inertial mass to the moving assembly. This additional inertia reduces the peak frequencies that the actuator is capable of achieving for a given displacement.

Secondly, the use of pneumatic cylinder and piston combination, rather than an airbag or mechanical spring, introduce friction due to sliding seal between the pneumatic cylinder and piston. This friction will affect the net force that is applied to the test subject, and may also result in wear and reduced life of the actuator.

Thirdly, the arrangement taught by U.S. Pat. No. 8,844, 345 requires an unnecessary level of complexity in construction due to the need to couple an electrical machine, pneumatic cylinder, movable member and mount for a test subject within each actuator test frame, resulting in increased cost and size of the overall device.

WO2018/142137 teaches the provision of a linear electrical machine having a housing body. The housing body is formed from a typically cylindrical wall and by end walls defining a hollow interior. The interior holds a stator, typically a tubular linear electrical machine stator, which has a cylindrical bore extending axially from one end of the stator to the other end. Thus, the housing body and the stator define a working cylinder. A central core is fixed at least axially relative to the stator 14 within the working cylinder and, in this arrangement, is fixed at a central core fixing point to the end wall. The upper end of the central core is surrounded by a hollow translator, such that the translator slides over and outside the central core.

The central core and the stator define a stator bore cavity therebetween. The stator bore cavity is a cylindrical annular space within which the translator is axially movable relative to the stator. An exterior magnetic circuit airgap exists between the translator and stator. In this example embodiment, the housing and therefore the stator are rigidly held and the translator moves within the stator and over the central core.

The main function of the central core is to provide co-axial location of the translator within the stator bore, and a linear bearing for the translator motion, this bearing being typically distributed throughout the entire length of the stator in order to support the electromechanical side loads generated by the stator If the co-axial location is not precisely aligned, the resulting electromechanical side-loads result in an overloading of the linear bearing and consequent friction and wear.

Linear electrical machines can also include a working chamber wherein a change in the working chamber volume causes motion of a translator which then induces an electric current in one or more coils, or wherein motion of the translator caused by an electric current in one or more of the coils causes a change in the volume of the working chamber. Examples of such systems include use as a free piston engine linear generator where combustion pressure acts upon a translator to produce useful electrical power output, use as a gas expander where a high pressure gas acts upon a translator to produce useful electrical power output, use as a gas compressor where an electrical input induces movement in a translator to pressurise a gas, use in hydraulic systems where movement of the translator causes or is caused by displacement of hydraulic fluid within a working chamber.

Many of the problems that are described above in relation to using a linear electrical machine as an actuator are also present when using such a device as a motor or generator acting upon a fluid contained within a working chamber, so similar benefits are also achieved. In particular, a free piston engine linear generator must effectively control the motion of the piston to achieve a consistent compression and expansion ratio desirable for efficient and low-emissions combustion. The challenge of piston motion control is widely recognised in prior art as the principle challenge that must be solved before the free piston engine format can be successfully developed and commercialised. Linear electrical machines that are typically employed in free piston engines are rarely able to achieve the desired level of motion control due to these machines having a high piston mass relative to the force that can be applied by the electrical machine. This metric, or its reciprocal (force per unit of moving mass) which is sometimes referred to as 'specific force', is the most important determinant of free piston engine motion control.

Good piston motion control performance is also essential in other applications that use a linear electrical machine as a motor or generator acting upon a fluid contained within a working chamber, including free piston gas expanders (for example within a rankine cycle waste heat recovery system or refrigeration cycle), free piston gas compressors and free piston pumps since the piston motion determines the pressure or displaced volume that is achieved at the end of the stroke. Any uncontrolled variation in the end of stroke position of the piston therefore directly impacts the function of the device.

The present invention aims to address one or more of the problems identified above.

According to the present invention, there is provided a linear electrical machine (LEM) comprising: at least one stator mounted in a housing, the housing and at least one stator defining a working cylinder; a two-section central core within the working cylinder, wherein the two sections of the core are co-axial, separate and cantilever mounted within the working cylinder; a cylindrical stator bore cavity between the working cylinder and the two central core sections: and one or more hollow translators. each translator being axially movable within the stator bore cavity, such that each section of the central core is traversed by part of the one or more translators, thereby forming an exterior magnetic circuit airgap between the respective translator and stator.

Such an LEM is beneficial as it reduces cantilever length of any individual part of the central core for a given output of the LEM. Alternatively, it permits a greater functional stroke length in a given geometry of LEM, thereby increasing the output from an LEM of a given size and shape.

This can be further understood by the following which is described with reference to FIGS. 21 and 22:

The geometry of a linear electrical machine with a central core may be characterised by five linear dimensions;
1) The stator length S
2) The functional stroke length F
3) The central core length C
4) The central core bearing length B
5) The translator length T The stator, when engaged with the translator, may produce a force on the translator so as to exchange useful work with the translator. The functional stroke length F is the amount of relative movement between a translator and a stator during which useful work is done. Useful work is the product of axial electrical machine force (Newtons, typically proportional to S) and translator's axial motion (metres, typically equal to F) that results in the generation of useful electrical energy output or useful mechanical motion output (Newton.metres). All other things being equal, increasing S and F will increase the useful work output of the machine.

The main function of the central core, whose length is C, is to provide co-axial location of the translator within the stator bore, and a linear bearing for the translator motion, this bearing being typically distributed throughout the entire length of the stator S in order to support the electromechanical side loads generated by the stator i.e. S=B. If the co-axial location is not precisely aligned, the resulting electromechanical side-loads result in an overloading of the linear bearing and consequent friction and wear.

In this arrangement the function of the central bearing typically requires the journal on the inside of translator to remain engaged throughout the stroke, and therefore T>S+F, For any given radial geometry;
i) Electrical machine force is typically applied uniformly per unit length of the stator
ii) Translator mass is typically proportional to translator length.

Therefore for applications where a high specific force is required (Force/mass), it is desirable that T/S should be minimised. If T>S+F, it is also the case that T/S>1+F/S and therefore to minimise T/S, it is desirable that, subject to other constraints, the ratio of stator length to translator length S/F should be maximised.

The precision of co-axial location provided by the central core is impacted by (i) cantilever bending under the action of electrical machine side loads, which increases with the third power of the length of the cantilever length, and (ii) by the manufactured tolerances (including straightness and perpendicularity) between the central core axis and the plane of the cantilever root, which increase linearly with the cantilever length.

For a given electrical machine side load (proportional to S), halving the cantilever length C of the central core therefore results in an eightfold reduction in bending impact and a halving of the mechanical tolerance impact on the translator-stator concentricity constraint provided by the central core.

For this reason, it is desirable that to maximise useful work output, subject to other constraints, the ratio of the central core length to stator length and functional stroke (i.e. both C/S and C/F) should be minimised.

In a LEM with a single central core such as in FIG. 2, for the central core to provide a linear bearing across the complete length of the stator the length of the central core length C>F+S.

It is therefore also the case that C/S>F/S+1 and that that C/F>1+S/F.

In a LEM with a split central core, the length of the central core C>F+S/2 and it is therefore also the case that C/F>1+½(S/F) Therefore, providing a central core in two or more sections, each of which can be separately supported by its own cantilever, means that in machines designed for high specific force (in which both S/T and S/F are maximised):
  a) the length of the cantilever per unit of stator length (C/S) can be halved
  b) the length of the cantilever per unit of functional stroke length (C/F) can be halved.

In an embodiment in which two central cores face towards a common central chamber, the stroke of each independent translator may be combined to double the effective functional stroke length (F=2×F') acting on a common working chamber, for a given cantilever length C so that the length of the cantilever per unit of functional stroke length (C/F) can be halved.

The core sections are preferably opposed and may be directed towards each other.

Each core section may extend from an end of the housing towards the axial centre.

A single translator may be movable over both core sections.

The translator may include at least one element projecting inwardly on a section of the translator that is free to reciprocate between the central cores. The at least one projecting elements may provide a force coupling feature to which other elements can be connected or abut. In one example, the force coupling feature may take the form of a central support, which is located between the two cores, and reciprocates with the translator between the two central core sections.

The force coupling feature may have no openings, and thereby may define a pair of chambers between the force coupling feature and the free end of the respective central core sections, such that the pressure within each chamber acts over the surface of the force coupling feature. The central support, which may act as a force coupling feature, may take the form of a solid wall.

At least one of the central core sections may be hollow. A force connecting rod may be connected to the interior of the translator and may extend through the hollow core section. The purpose of the force coupling feature is to connect the force connecting rod to the translator so that a force can be applied to the translator by the force connecting rod leading to the generation of an electric current, and therefore can take any suitable form.

The force connecting rod may be connected to the force coupling feature.

Two translators may be provided, such that first and second translators are movable over respective central core sections to form separate exterior magnetic circuit airgaps between the respective translator and stator.

The stator may be formed in two parts, with separate stator parts associated with each central core.

The two translators may define a central chamber therebetween, such that the pressure within the chamber acts over the surfaces of the two translators.

The two translators may be located in the same working cylinder.

The invention defined above may include one or more of the following.

The above linear electrical machine having a two part core may comprise a stator mounted in a housing, the housing and stator defining a working cylinder, a central core within the working cylinder and defining a cylindrical stator bore cavity therebetween, a hollow translator axially movable within the working cylinder, extending into the stator bore cavity and forming an exterior magnetic circuit airgap between the translator and the stator, at least one flexure or bearing between the central core and the translator providing coaxial location of the translator within the stator bore cavity, wherein the central core is axially fixed in relation to the stator.

The bearing or flexure could be a fluid bearing, which could be a gas bearing, and which would typically be suitable for applications where the working cylinder contains a gas. Alternatively, the fluid bearing could be a hydrodynamic or hydrostatic bearing, which would typically be suitable for applications where the working cylinder contains a liquid. Where the specification refers to the use of a fluid bearing this should be taken to mean any of a gas bearing, a hydrodynamic bearing and a hydrostatic bearing. The fluid bearing may provide coaxial location of the translator and central core.

By virtue of this arrangement, and in particular the fluid bearing between the central core and the translator, there is no requirement for additional translator length beyond the lower end of the stator in order to remain engaged with an external fluid bearing beneath the stator, and the mass of the translator is thereby substantially reduced for the same electromagnetic force. In addition to providing coaxial (and therefore concentric) location of the translator and central core, the fluid bearing also provides a reaction force to oppose any side loads that are generated by the linear electrical machine stator. The provision of a fluid bearing on the central core and within the upper and lower ends of the electrical machine stator reduces the length of the side load force transmission path between the stator and the fluid bearing. Side load force transmission by the translator to the bearing positions may result beam bending between bearings or cantilever bending to either side of a single bearing. Such bending may result in non-concentric location between the translator and the central core and, by extension, non-concentric location between the translator and the stator, and is therefore undesirable. The arrangement of the present invention therefore reduces the requirement for additional translator mass to provide sufficient translator stiffness to limit translator bending under the action of electrical machine stator side loads. The present invention therefore is able to maintain the coaxial (and therefore concentric) relationship between the linear electrical machine stator and the translator with a greater electrical machine force per unit of moving mass than for alternative arrangements.

At least one of the fluid bearings is preferably mounted on the central core and runs on a bearing surface formed on a part of the interior of the hollow translator. The fluid bearing is typically a separate component providing a flow of gas or liquid bearing fluid from a supply and into the bearing gap. Locating the fluid bearing on the fixed central core rather than on the translator avoids the additional mass of this component contributing to the translator's moving mass. The bearing journal surface may be formed on the structure of the hollow translator and does not require the addition of a separate component to the translator. This arrangement therefore permits the incorporation of a fluid bearing function to transmit side loads generated by the electrical machine stator into the central core whilst keeping the translator's moving mass to a minimum.

The at least one fluid bearing preferably defines a coaxial (and therefore concentric) location of the translator and stator and the exterior magnetic circuit airgap therebetween. This arrangement therefore permits the incorporation of a low friction fluid bearing function to precisely locate the translator relative to the central core and magnetic circuit airgaps whilst keeping the translators moving mass to a minimum.

A labyrinth seal may be used, in which the flow of fluid and the difference in pressure between the working chamber and the fluid bearing is controlled by provision of a series of annular channels in the translator. A labyrinth seal is a non-contact seal that is commonly used in piston expander and compressor applications. The application of a labyrinth seal in the present invention eliminates the friction that would otherwise be associated with a contact seal, and also removes the requirement for a separate fluid pressure relief feature between the fluid bearing and the working chamber.

The LEM may further comprise at least one working chamber and/or preload chamber within the working cylinder for applying a force to the translator. The working chamber and/or preload chamber is preferably coaxial with the stator bore and bearing gap. By virtue of this arrangement the present invention permits close integration of the working and/or preload chambers within the construction of the LEM and helps reduce the overall size of the machine. The preload chamber contains fluid supplied at an elevated pressure and which applies a net force on the translator. In the actuator configuration, this helps balance the test subject weight and/or to ensure the test subject is in the correct position prior to testing starting. This close integration also eliminates the need for a separate mechanical element to provide a load path between the working and/or preload chambers and translator so that the moving mass is reduced.

The use of rigid wall elements to form the preload chamber also avoids the use of compliant materials such as those used in an airbag or mechanical spring. This reduces the impact of actuator system resonances that might otherwise affect the input function that is applied to a test subject.

This arrangement also provides an actuator or LEM which is compact in size, especially in its width.

The provision of at least one fluid bearing provides a very low friction interface between the translator and the stator. This arrangement offers lower mechanical friction and wear than is typically found with sliding contact bearings, and offers this benefit without the reciprocating mass penalty of rolling element bearings. This arrangement therefore allows higher frequency operation due to the low inertia of the system. In addition, the fluid bearings can form part of an effective non-contact pressure seal to retain pressure in any working chamber without the friction associated with contact seals.

The invention refers to a magnetic circuit airgap. For the purpose of the invention, this term refers to a gap in which the relative permeability is close to that of air. The gap may or may not contain air or another fluid. Such usage is well known in the field of electrical machines.

One or more bearing journals may be provided on either or both of the inner and outer surfaces of the translator.

The preload chamber may act like a spring, in which the chamber has a non-zero spring rate, such that the preload force changes as the translator moves. In an alternative arrangement, the chamber can be arranged such that it has a zero-spring rate. The preload chamber may be provided with at least one conduit for regulating the pressure within the chamber. Such a conduit allows the pressure within the preload chamber to be regulated to a constant value, thereby providing a zero-spring rate arrangement.

The electrical machine may be of a moving magnet type in which magnets are fixed to the movable translator. A moving magnet type machine offers a high electrical machine force per unit of moving mass than other electrical machine types. One embodiment uses a sub-type of moving magnet machine commonly known as a slotted machine in which the flux circuits are carried by magnetically permeable materials and the magnetic flux is cut by current flowing in copper coils set into slots within this material.

An alternative sub-type of moving magnet machine is commonly known as a slotless machine, which offers higher peak force and lower cogging force, but lower efficiency than slotted machine types. Alternative embodiments may use other established linear electrical machine types including flux switching and switched reluctance machines. Each of these machine types does not include magnets in the translator, permitting the translator to run at higher temperatures associated with internal combustion and rankine cycle heat recovery applications without the risk of degradation of the magnetic materials and consequent impaired performance of the electrical machine.

The movement of the movable part of the end wall is preferably coaxial with the stator bore which helps to minimise the width of the LEM. The magnetic circuit airgap is preferably cylindrical.

For an actuator, a test subject mounting point is preferably fixed to the translator, normally at its upper end. An anchor point may be provided instead of, or as well as, a test subject mounting point. The anchor point is a location to which an external element can be fixed, joined or otherwise connected, whereas a test subject mounting point is a type of anchor point provided specifically for the purposes of transmitting a force to a test subject.

The fluid bearing preferably acts upon a fluid bearing journal on the inner surface of the translator. Alternatively or additionally the fluid bearing acts upon a fluid bearing journal on the outer surface of the translator.

The LEM may further comprise an encoder connected to the translator which typically senses one or more of position or velocity. The encoder may use at least one optical, magnetic or mechanical sensor. The encoder assists controlling the actuator by determining the position and/or speed of the translator.

At least one bearing gap may include a plurality of axial extending arcuate cross section channels arranged around the translator. The bearing gap may be either cylindrical or include two or more arcuate sections.

The LEM may include a housing body containing one or more cooling channels. These cooling features permit a higher electrical machine force to be applied to the translator by removing heat generated by current flowing in the stator.

One example of the present invention will now be described with reference to the accompanying drawings, in which:

FIG. 1 is an external view a first LEM operating as an actuator 10 having a motion axis 20 along which a translator (shown later) moves and the locations of various planes for further sectional views.

Figure 2:
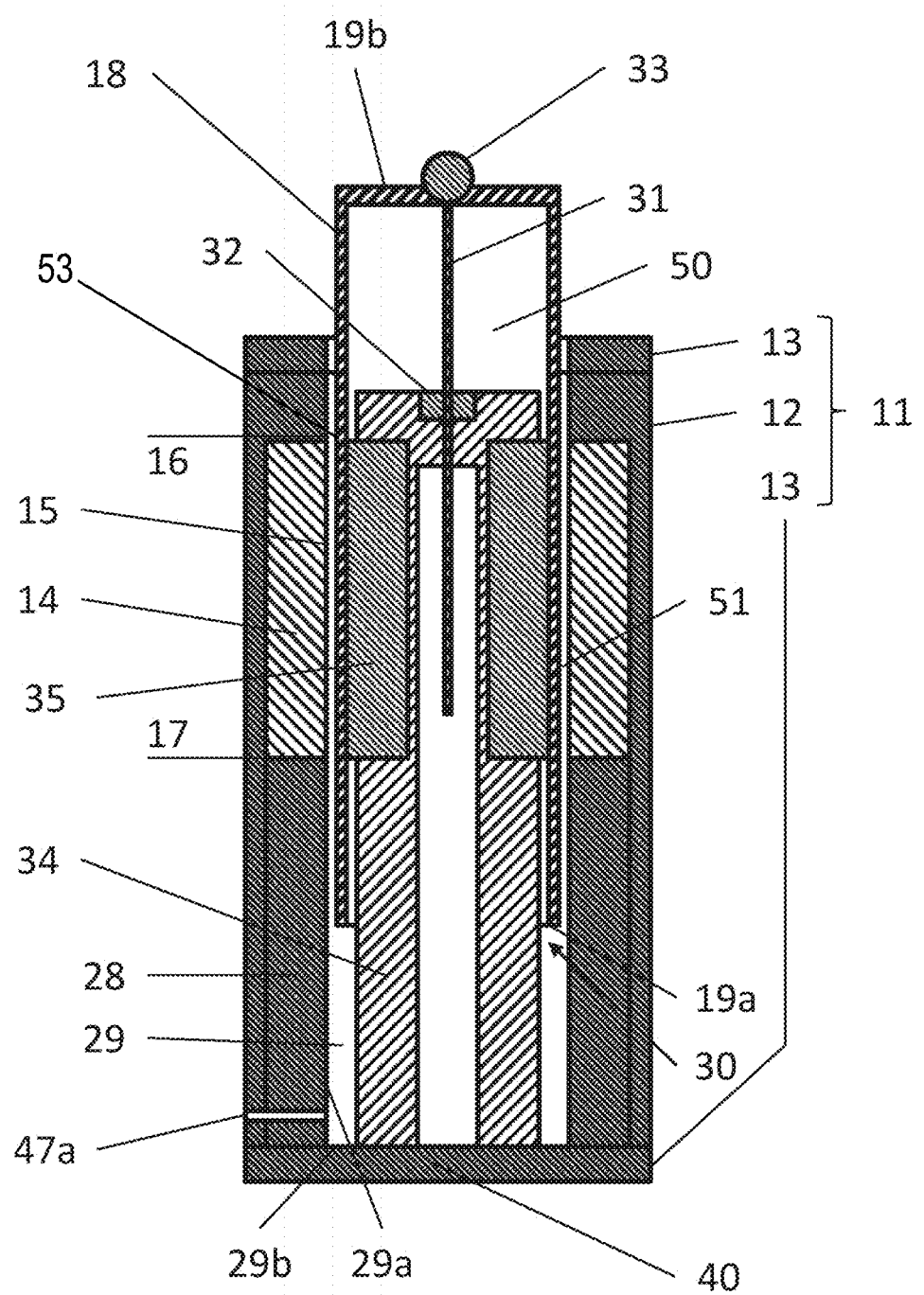
FIG. 2 is an axial section AA through the LEM of FIG. 1 mid stroke.

FIG. 2 shows the actuator 10 having a housing body 11. The housing body 11 may be a formed from a single component. Alternatively, the housing body 11 maybe formed from an assembly of several components including, but not limited to, a cylindrical wall and end walls. The housing body 11 may include a number of components, i.e. a number of walls, that form one or more additional housing bodies including, but not limited to, a chamber housing (defining a preload chamber) or a stator housing (defining a stator) The housing body 11 is formed from a typically cylindrical wall 12 and by end walls 13 defining a hollow interior. The interior holds a stator 14, typically a tubular linear electrical machine stator, which has a cylindrical bore 15 extending axially from one end 16 of the stator to the other end 17. Thus, the housing body and the stator define a working cylinder 53. A central core 34 is fixed at least axially relative to the stator 14 within the working cylinder and, in this arrangement, is fixed at a central core fixing point 40 to the end wall 13. The upper end of the central core 34 is surrounded by a hollow translator 18, such that the translator slides over and outside the central core 34.

The central core 34 and the stator define a stator bore cavity 51 therebetween. The stator bore cavity is a cylindrical annular space within which the translator 18 is axially movable relative to the stator 14. An exterior magnetic circuit airgap 21 (see FIG. 9) exists between the translator and stator. In this example embodiment, the housing and therefore the stator are rigidly held and the translator 18 moves within the stator 14 and over the central core.

A single elongate internal fluid bearing 35 is mounted on the central core and, in this example, no exterior fluid bearing is provided in the housing body 11. The fluid bearing is substantially the same length as the stator 14 so that any side loads generated by the electrical machine are matched by an opposing force applied by the fluid bearing in the same axial position.

Figure 16:
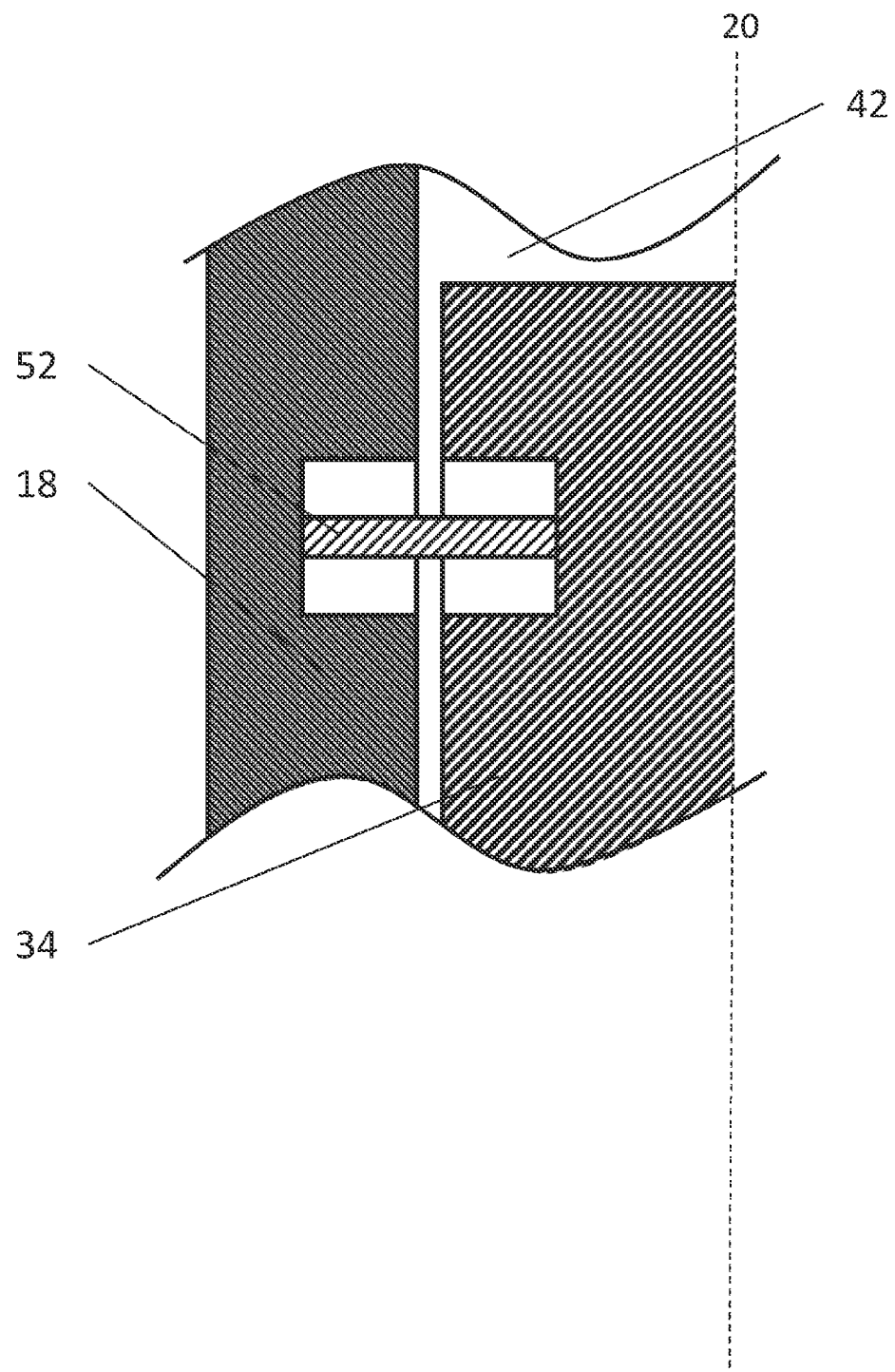
FIG. 16 is an enlarged axial section BB showing the use of a flexure.

In an alternative example, the bearing may be replaced by, or supplemented with, one or more flexures 52, shown in FIG. 16. This is particularly relevant in applications where the translator movement is small, typically less than 2 mm. Such applications may include, but are not limited to systems that apply a short motive input such as in vehicle suspension systems to control ride dynamics. In particular, given typically limited headroom, any system that applies a damping force to a suspension system especially one mounted inside vehicle. The flexure may take the form of a plate spring, leaf spring, diaphragm or other elastic or flexible element between the central core and the translator, and may or may not have axial holes or gaps. Further examples of flexures are shown in U.S. Pat. No. 5,522,214. In either example, the flexure or the fluid bearing constrain the radial motion of the translator and provide coaxial location of the translator within the stator bore cavity.

A chamber housing 28 defines a preload chamber 29. In this example, the chamber housing is within the housing body and retained by end wall 13. However, the chamber housing could form the end wall and does not necessarily have to be within the housing body 11. An opening 30 into the preload chamber is closed by an end 19a of the translator. In this way, the sliding movement of the translator alters the volume of the preload chamber. The preload chamber is also provided with at least one conduit 47a through which pressurised fluid can be supplied to provide the necessary force onto the translator. The chamber 29 contains a fluid which is typically a gas (although a liquid is also possible) supplied at an elevated pressure and which applies a net force on the translator 18 in order to balance the test subject weight and/or to ensure the test subject is in the correct position prior to testing starting. Alternatively or additionally an equivalent preload chamber function may be performed by chamber 50 formed between the upper end of the central core 34 and the translator 18.

The sliding movement of the translator 18 within the cylindrical stator bore 15 changes the volume of preload chamber 29 and so creates the same effect as a piston moving within a cylinder. The working fluid in the preload chamber 29 is preferably a compressible gas, however this fluid could also be an incompressible liquid such as a hydraulic fluid which would be displaced through conduit 47a by the motion of the translator 18. This arrangement leads to improved test subject input signal quality when compared to airbag type preload force systems in which the translator motion and associated gas volume change is accommodated by the changing shape of a compliant element whose compliance may result in unwanted system behaviour such as resonance or damping.

In any of the examples described, the preload chamber is formed by a side wall 29a, which may or may not be a cylindrical wall, a first end wall 29b typically formed by an inner surface of the end wall 13 or the housing 12 and which is fixed with respect to the side wall 29a, the translator 18 and also by the outer surface of the central core 34. The chamber 29 is therefore generally annular. The preload chamber may not be a fully closed volume, and in addition to conduit 47a other small gaps may exist between the translator 18, the central core 34 and the chamber housing 28. For the purposes of the definition of the preload chamber volume, any such gaps are considered as integral parts of surfaces 29a, 29b and 19a. One or more seals, for example polymer gas seals, may be provided in this, or any other of the examples, to prevent significant leakage of the pressurised fluid from the preload chamber through such gaps.

The volume of the preload chamber 29 is varied by movement of the translator. The first end wall 29b could also include a movable element which can vary the volume of the preload chamber together with the translator. Such a construction is less preferably due to the more complex control that would be required. Alternatively or additionally, a further wall element may be mounted on the translator 18, to act as the movable part of the second end wall. In this way, the translator itself may not define part of the preload chamber, but an additional element movable with the translator does. The preload chamber may have a uniform cross section along the axis 20.

The upper end 19b of the translator 18 extends out of the upper end of the actuator 10 and is provided with a anchor point 33. The anchor point may be used for a test subject. The anchor point could be a flat plate or other surface onto which a test subject is positioned and held in place under its own weight, e.g. a vehicle resting on its tyres, each tyre positioned in contact with a test actuator. Alternatively, the anchor point could include one or more fixing means for securely fastening the translator to a test subject or part of an external system to which an input is applied. This may include one or more holes through the end of the translator.

In the preferred embodiment an encoder body 32 is located on the central core and allows the encoder scale 31, mounted on the inner part of the upper end of the hollow translator 18, to remain within the actuator. In this example, the encoder is a position encoder and the encoder scale is a shaft, but the encoder scale could also be a flat surface and the encoder type could also be a speed/velocity encoder. The encoder body 32 is located within the upper end of the central core 34, but may be located anywhere suitable and provides information concerning the position and or speed/velocity of the translator to ensure the actuator can be controlled.

Figure 3:
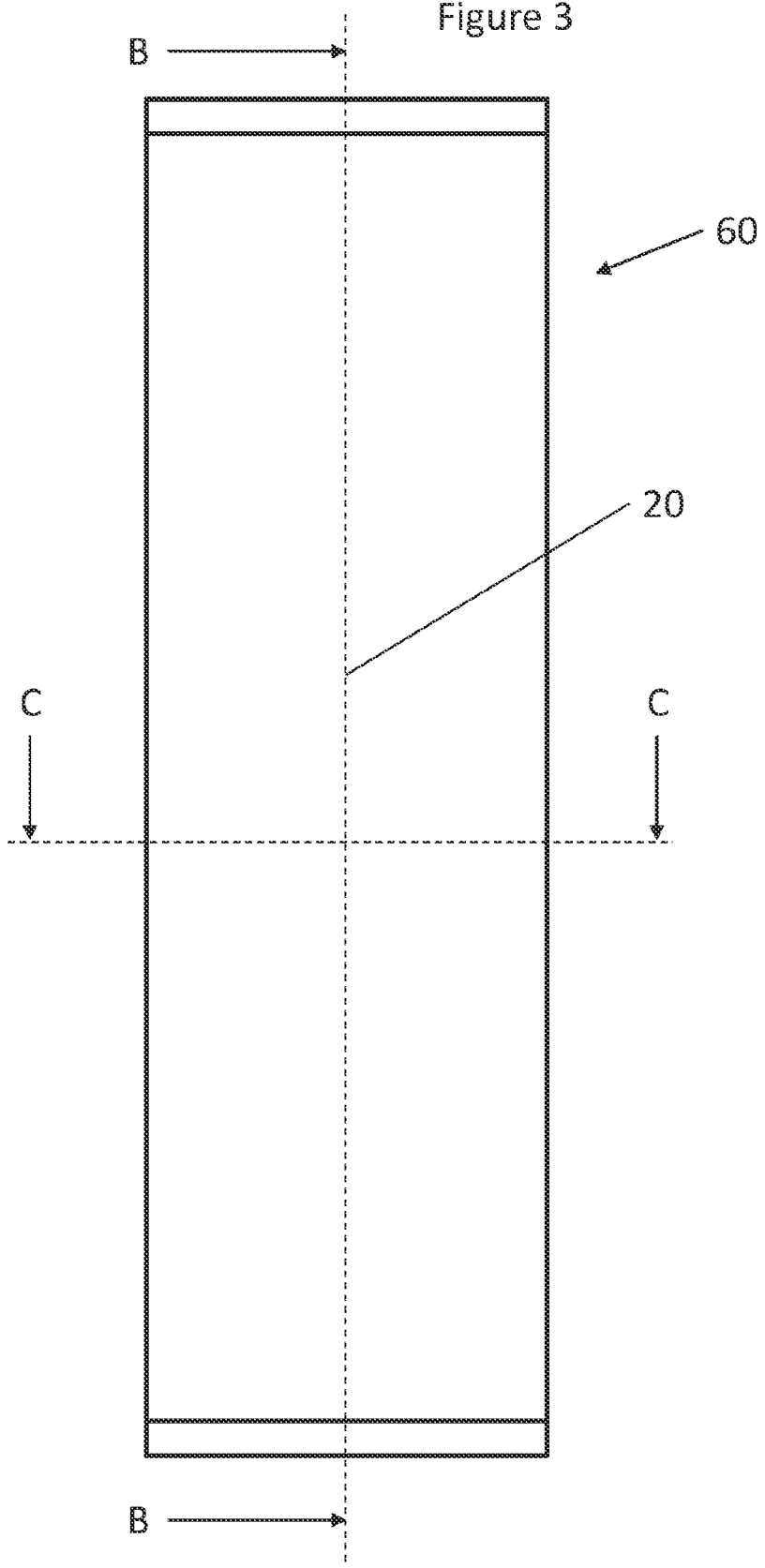
FIG. 3 is an external view of an alternative LEM showing section planes BB and CC.

FIG. 3 is an external view of a linear electrical machine (LEM) 60, which could be operated as a generator having a motion axis 20 along which a translator (shown later) moves and the locations of planes BB and CC for further sectional views. In subsequent figures, the same reference numerals are used as in FIGS. 1 and 2 for the equivalent components.

Figure 4:
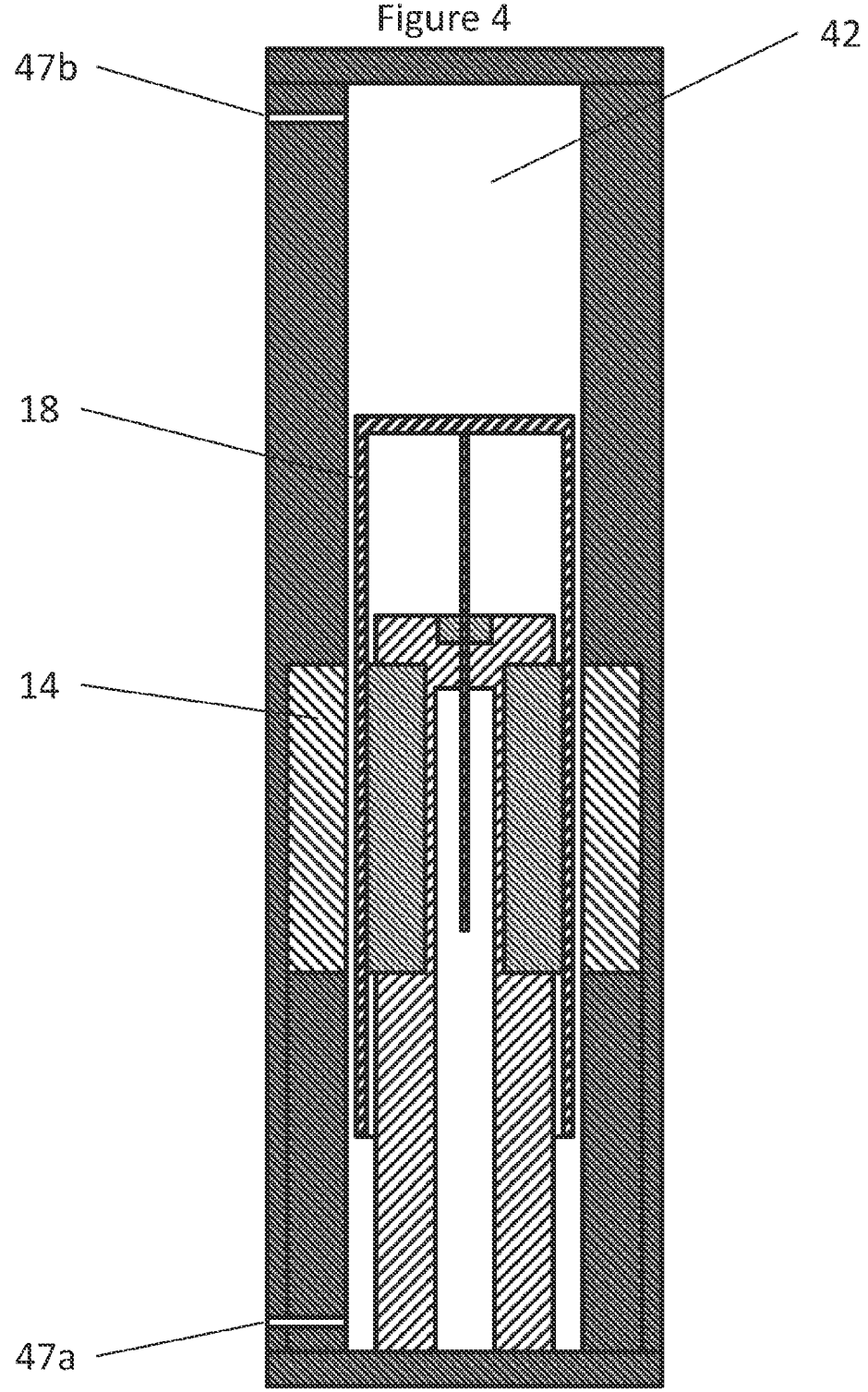
FIG. 4 is an axial section BB through the LEM of FIG. 3 showing a central core and internal fluid bearing.

FIG. 4 shows a cross sectional view of the LEM 60. The LEM 60 is identical to the actuator 10, except the addition of a working chamber 42 at the upper end, i.e. the opposite end to the preload chamber 29, the removal of the test subject mounting point 33 and the addition of a conduit 47b allowing fluid communication into and out of the working chamber 42. The working chamber could be a combustion chamber of an internal combustion engine, an expansion chamber for expansion of a high-pressure gas or two phase mixture to generate electrical power, a compression chamber for pressurising a gas or two phase mixture using electrical power, or a hydraulic chamber for receiving and displacing a hydraulic fluid or other liquid. The working chamber can act on the translator 18 to generate motion which then induces an electric current in the coils of the stator 14.

The working chamber 42 of FIG. 4 is shown having a similar diameter to that of the cylindrical stator bore 15. In an alternative embodiment the working chamber may have a smaller or larger diameter in relation to the cylindrical stator bore 15 and in this case the working cylinder 53 and translator 18 could be stepped, each typically having a section of similar diameter to the stator bore 15 and another section having similar diameter to the working chamber 42.

Figure 1:
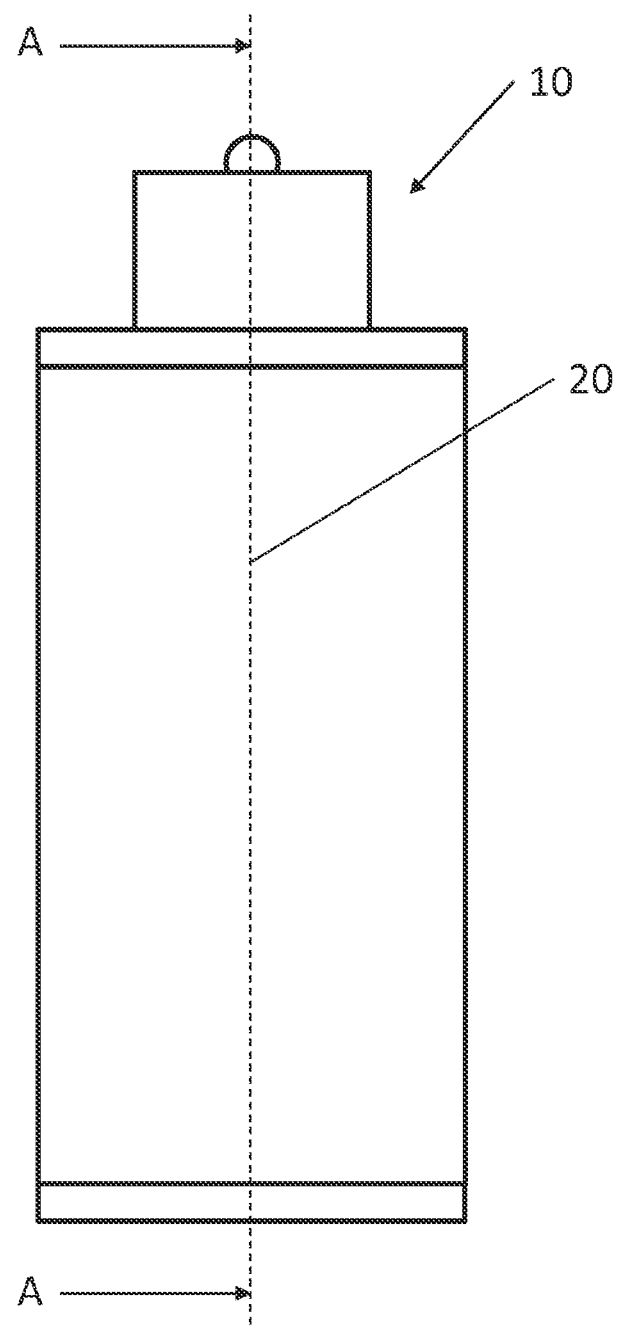
FIG. 1 is a linear electrical machine (LEM) configured as an actuator showing section planes AA.

The subsequent figures all depict the LEM 60, but any of the features disclosed therein, other than those specific to the working chamber, would be equally applicable to the actuator of FIGS. 1 and 2. For example, any of the fluid bearing configurations could be utilised in the actuator 10 just as easily as in the LEM 60.

A preload chamber 29 is provided to apply a controlled force to the translator 18 and acting to oppose or balance any force that may be applied to the translator by the working fluid in the working chamber. This function of the preload chamber 29 is to store translator energy that has not been recovered by the electrical machine when acting as a generator during the translator's downward stroke away from its 'top dead centre position' (i.e. the uppermost extent of its movement within the working chamber 42). After the translator has reached its bottom dead centre position the return of this energy to the translator 18, achieved as a result of the preload chamber applying a force on the translator during its upward stroke away from bottom dead centre, permits the linear electrical machine to continue acting as a generator on the return stroke back towards top dead centre. The pressure of the fluid within preload chamber 29 may be controlled by means of a preload chamber conduit 47a, which in addition may permit the preload working fluid to be displaced to and from the preload chamber as the volume of the preload chamber varies with the motion of the translator 18. The preload chamber 29 may be filled with the same fluid that is used in the working chamber 42 (for example, a rankine cycle fluid in the case of a rankine cycle gas expander application). Alternatively the preload chamber 29 may be filled with another fluid selected according to the requirements of the application, which may be a gas, a liquid or a two phase mixture. If a gas is used as the preload chamber fluid, the preload chamber may act as a bounce chamber, in which the pressure of the working fluid gas rises as the preload chamber volume reduces, resulting in a peak preload chamber force at or around a 'bottom dead centre' translator position shown in FIG. 7. This bounce chamber function of the preload chamber serves to reduce the time taken for the translator to stop and change direction at the bottom of the stroke, thereby increasing the operating frequency and power density of a free piston engine, gas expander or other device utilising a working chamber and preload chamber.

Figure 5:
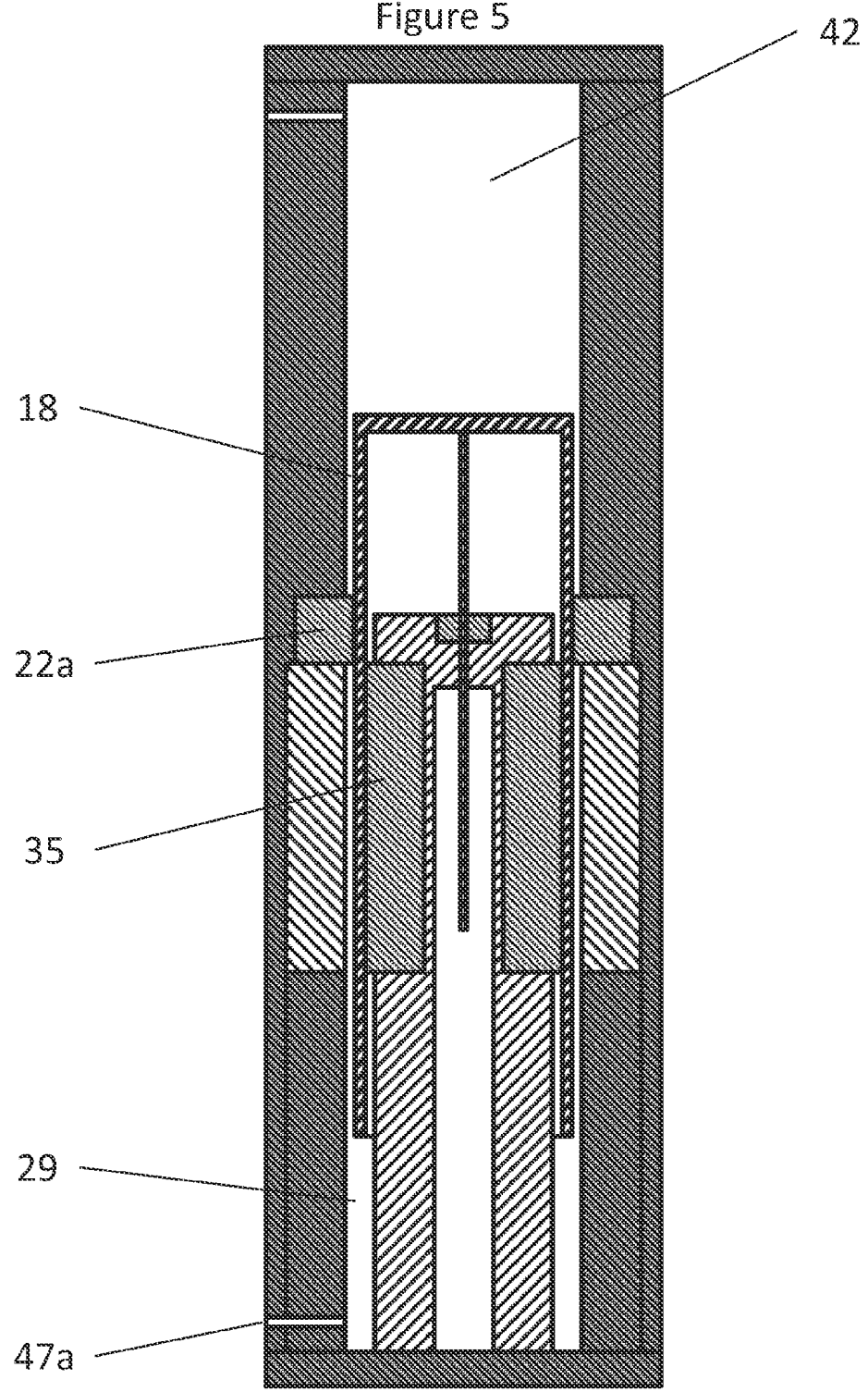
FIG. 5 is a perpendicular section BB showing interior and exterior fluid bearings.

FIG. 5 shows an alternative bearing configuration in which both an interior fluid bearing 35 and an exterior fluid bearing 22a are provided. Multiple exterior or interior fluid bearings could be provided if required.

Figure 6:
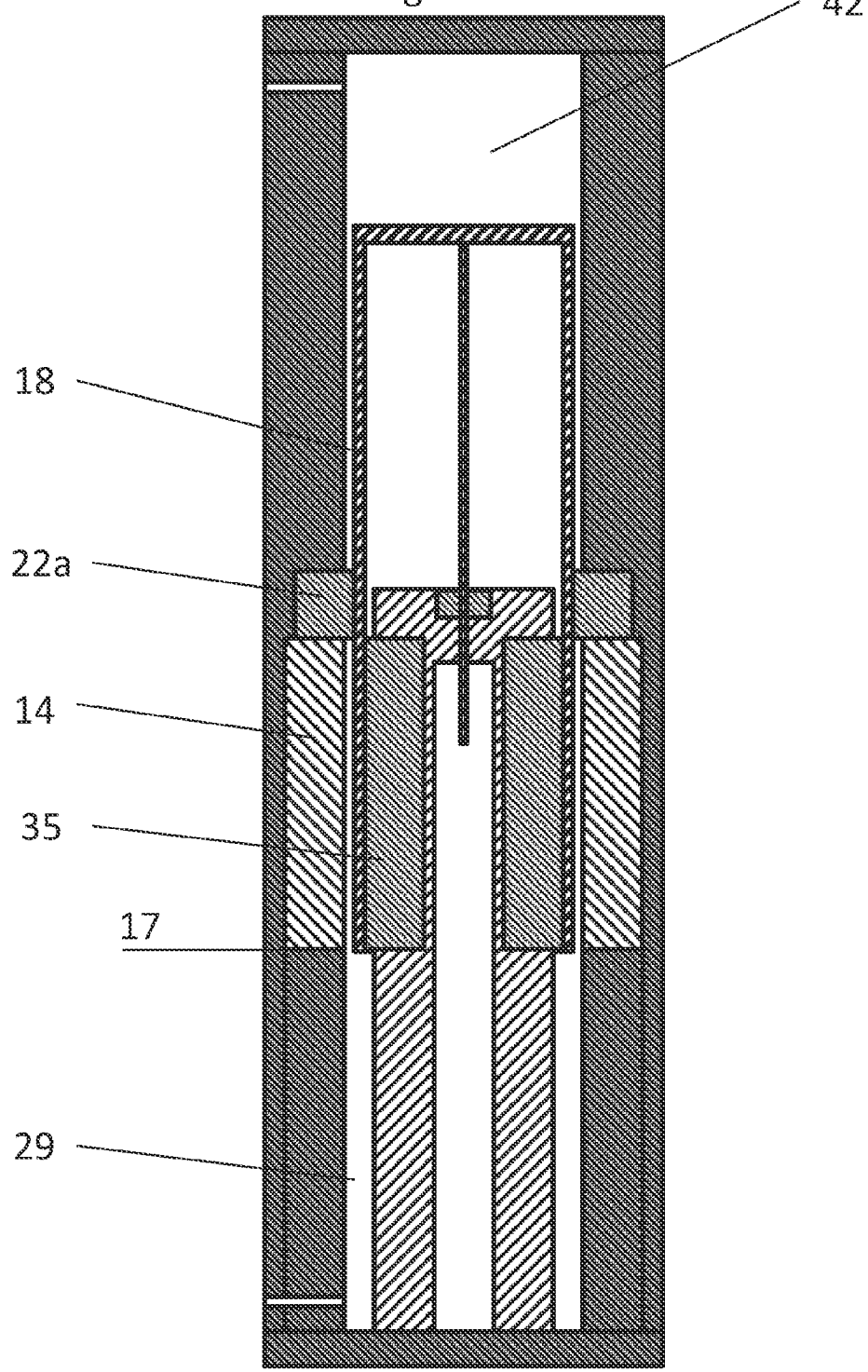
FIG. 6 is a perpendicular section BB showing the top of stroke or 'top dead centre' position.
Figure 7:
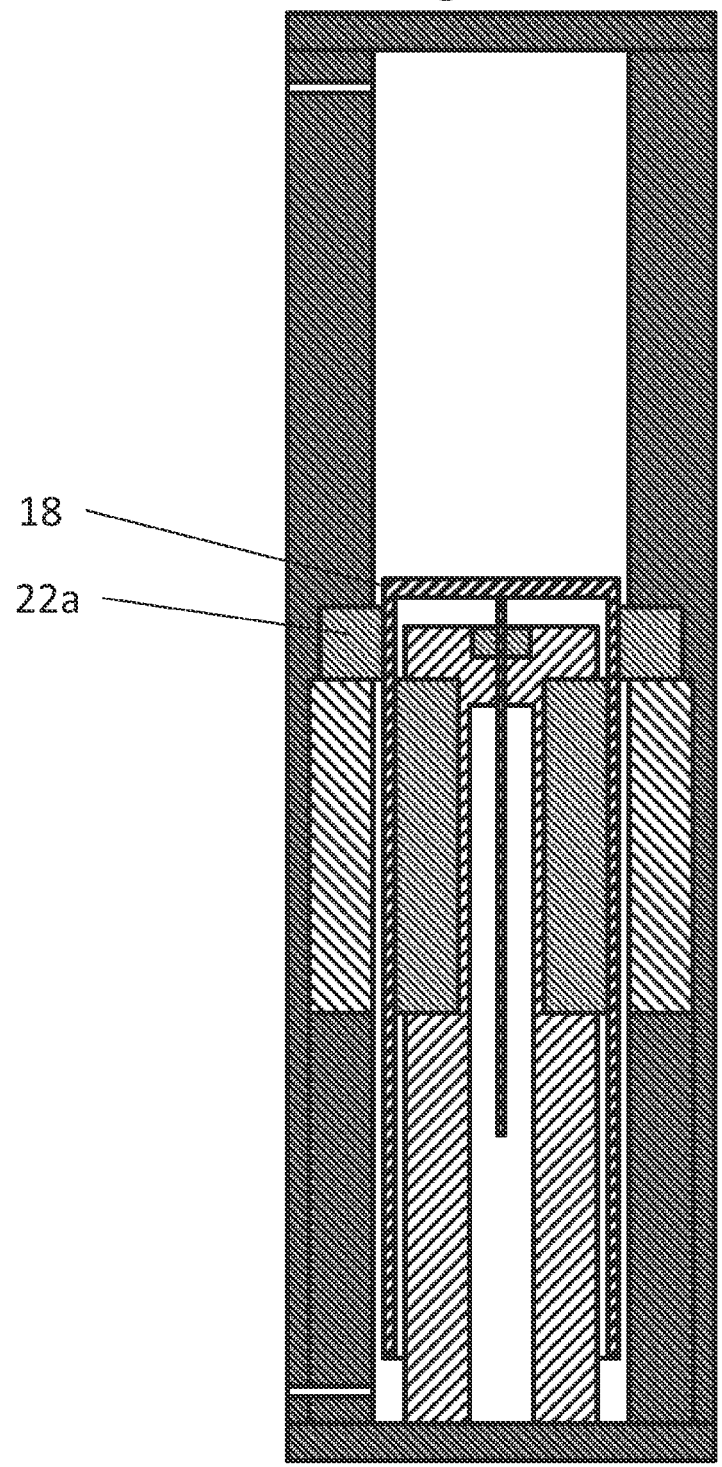
FIG. 7 is a perpendicular section BB showing the bottom of stroke or 'bottom dead centre' position.

FIGS. 6 and 7 illustrate the motion of the hollow translator 18 irrespective of the fluid bearing configuration, between the top of the stroke or 'top dead centre' position in FIG. 6 to the bottom of the stroke or 'bottom dead centre' position in FIG. 7. At the top of the stroke in FIG. 6, the lower end of the translator 18 is substantially adjacent the lower end of the stator 14 and in this position the volume of the preload chamber 29 is at its maximum, and the volume of the working chamber 42 is at its minimum. In this arrangement and as a result of the internal fluid bearing 35 there is no requirement for additional translator length beyond the lower end of the stator 17 in order to remain engaged with an external fluid bearing as might otherwise be required beneath the lower end of the stator 17, and the mass of the translator 18 is thereby substantially reduced for the same electromagnetic force. At the lower end of the stroke in FIG. 7, the upper end of the translator 18 is slightly above the level of the upper fluid bearing 22a, although in practice, the upper end may protrude further, or even be level with the upper end of the fluid bearing 22a.

Figure 8:
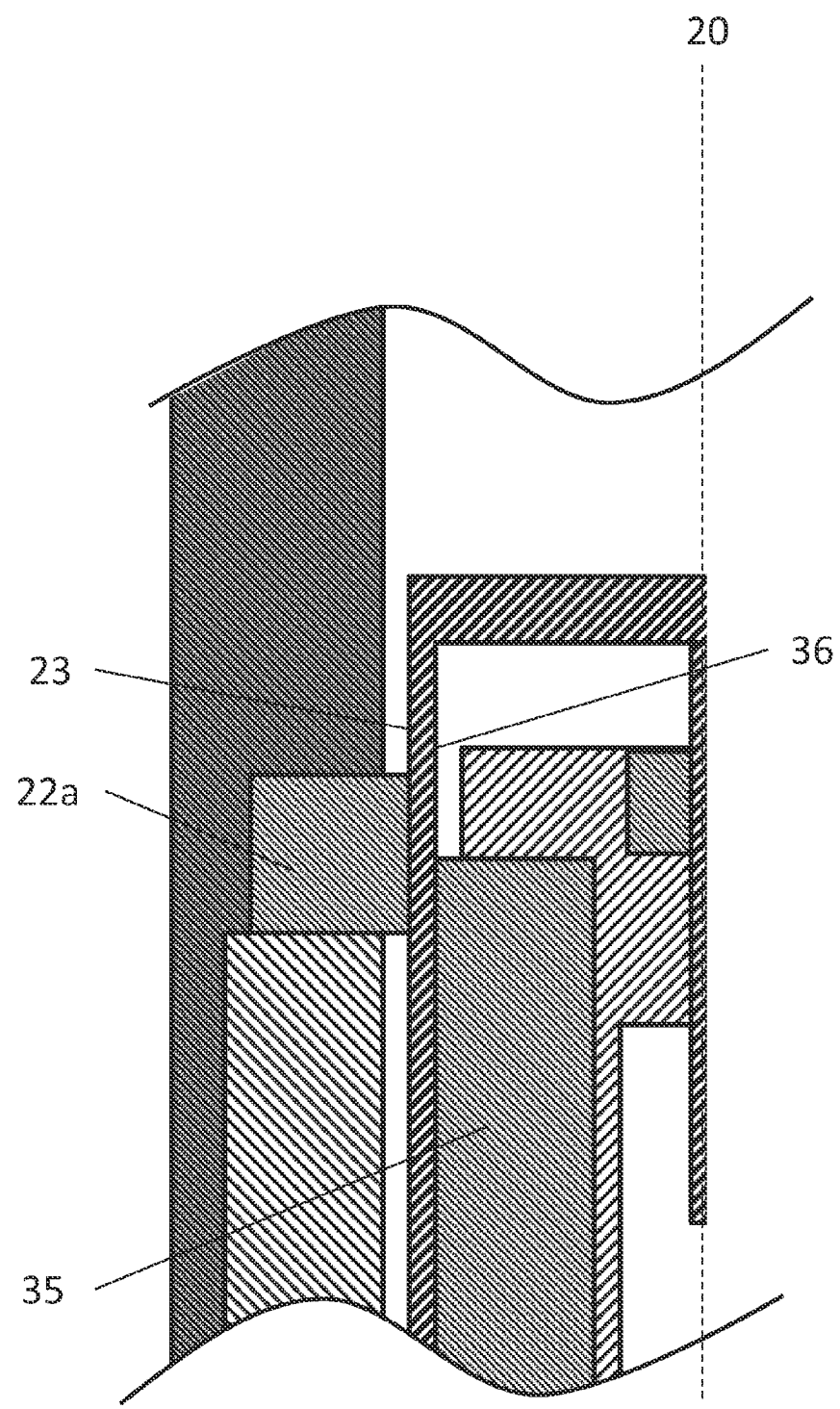
FIG. 8 is an enlarged view of perpendicular section AA showing the magnetic circuit airgap and bearing journal detail.
Figure 9:
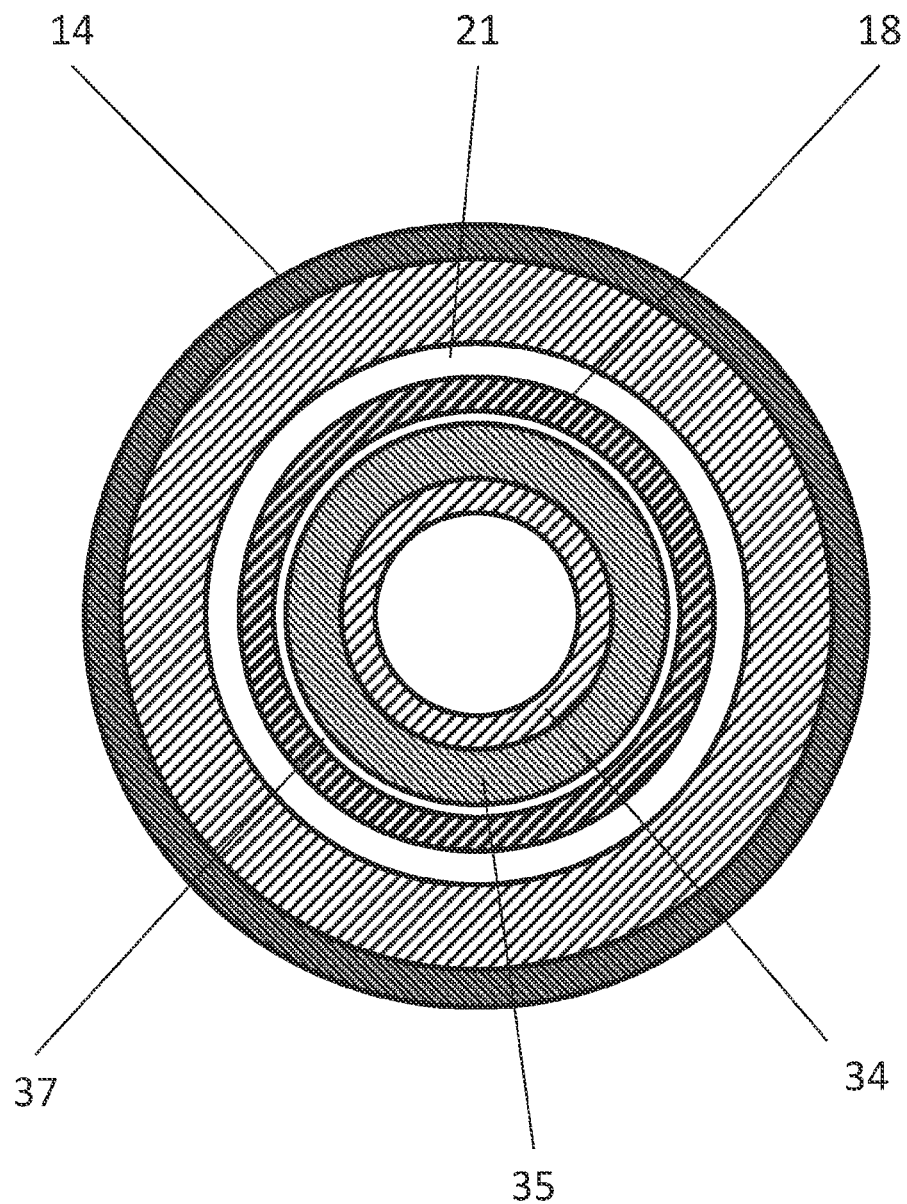
FIG. 9 is an axial section CC showing the concentric magnetic circuit airgap and bearing gap.

Greater detail of the interior bearing gap 37 and magnetic circuit airgap 21 is shown in the views of FIGS. 8 and 9. FIG. 8 also illustrates the location of an exterior journal 23 on the translator. This is the surface onto which any external fluid bearing 22a acts. An internal journal surface 36 is also shown and is the surface onto which any internal fluid bearing 35 acts. The journal surfaces are typically machined onto the appropriate locations on the translator and therefore do not require additional elements to be joined to the translator for this purpose, and would not typically be provided unless a corresponding fluid bearing was used.

The translator is kept in the coaxial position by the fluid bearing 35 which defines the interior bearing gap 37 between the outer surface of the fluid bearing 35 and one or more journals 36 on the interior surface of the translator. If one or more external fluid bearings 22a are also provided, the bearing gap between the inner surface of any external fluid bearing 22a and the outer surface of the translator and the magnetic circuit airgap 21 may be continuous. The relative sizes of any bearing gap and any magnetic circuit airgap are dependent upon the sizes of the translator, stator and fluid bearings. The bearing gap is typically smaller than the magnetic circuit airgap so that the magnetic circuit air gap thickness is more effectively controlled by the high radial stiffness of the fluid bearing.

Figure 10:
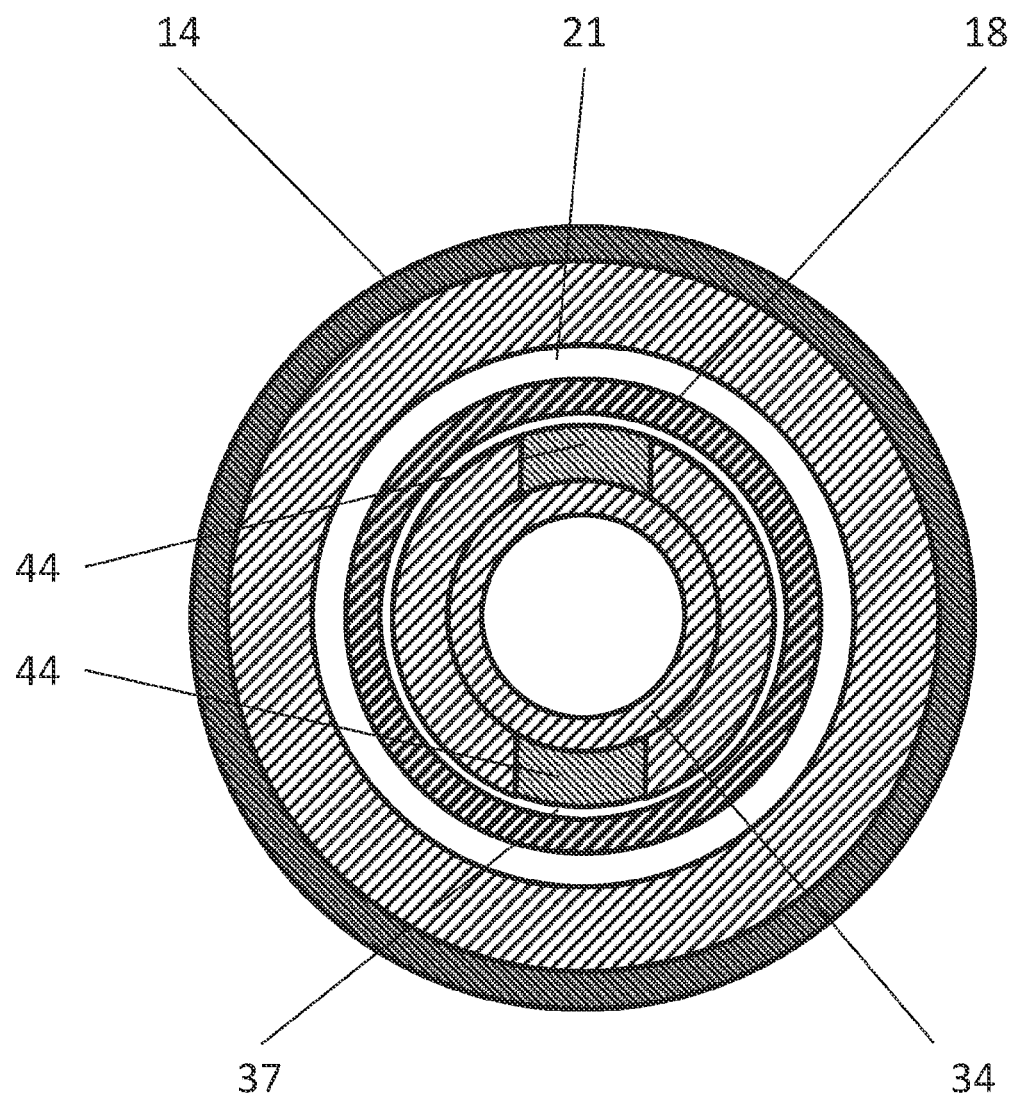
FIG. 10 is an axial section CC showing an alternative arrangement of internal fluid bearings.

Whilst the fluid bearings (whether internal or external) are generally annular elements having a porous structure through which a gas or other fluid is supplied under pressure to provide a load-bearing function at the bearing gap, any of the fluid bearings could take the form as shown in FIG. 10 in which the fluid bearing is formed from a plurality of fluid bearing shoes 44 spaced around (for exterior bearings) or inside (for interior bearings) the journal surface on which the bearing acts. Whilst two bearing shoes 44 are shown, three or four bearing shoes would be possible, and indeed a greater number would also be possible depending upon the size of the actuator and the loads which the bearing shoes experience. The bearing shoes are preferably spaced equally so as to provide even loading onto the translator and maintain the coaxial positioning of the translator relative to the stator. The fluid bearings could be formed from a generally porous material such as carbon. Alternatively the fluid bearing porosity could also be provided through an array of discrete holes machined within one or more solid bearing or bearing shoe components.

Figure 11:
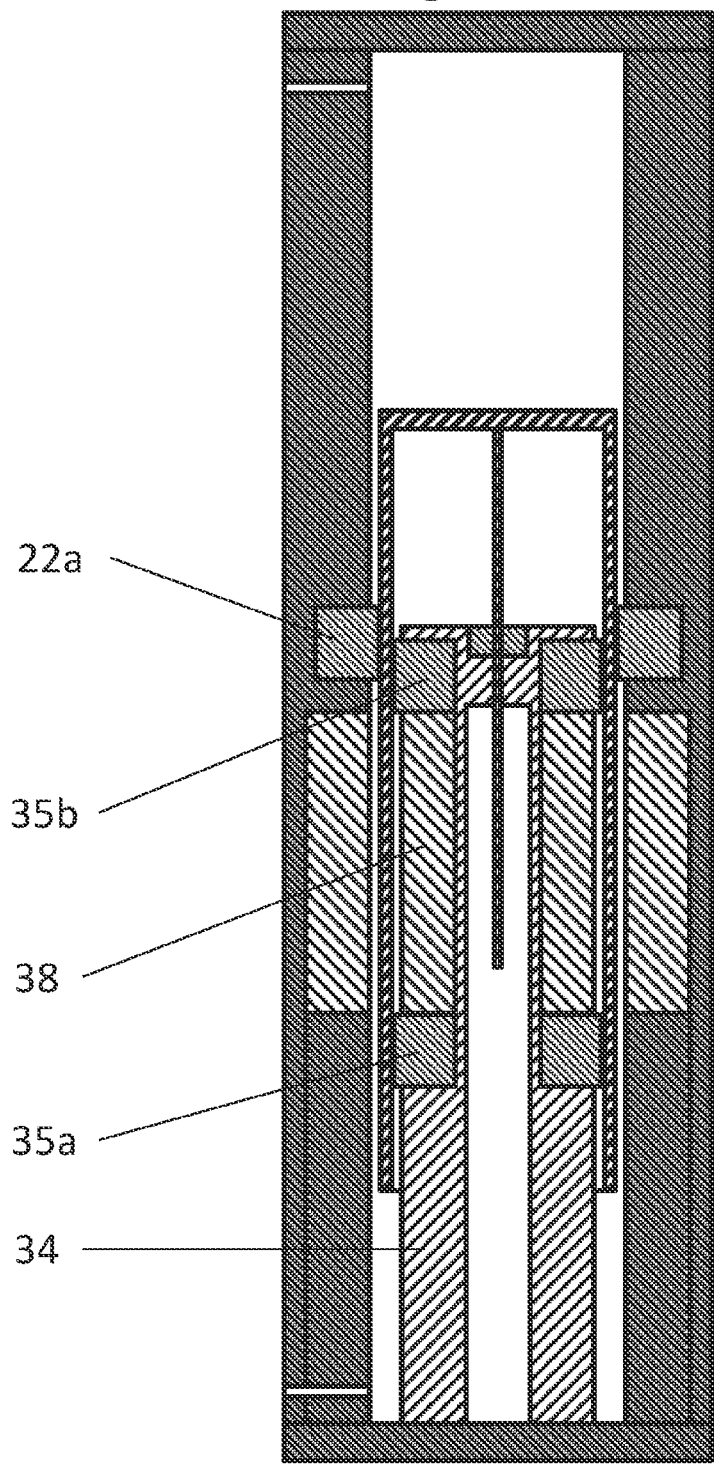
FIG. 11 is a section BB showing an alternative with central core and interior stator.

FIG. 11 illustrates that the interior fluid bearing (either with or without exterior fluid bearings), could alternatively be formed by two or more fluid bearings. In this example, the interior fluid bearing is replaced by an upper interior fluid bearing 35a and a lower interior fluid bearing 35b, and in addition an exterior fluid bearing 22a is also shown at the top of the stator.

The splitting of the interior fluid bearing permits the axial space between to be utilised, in this case by the inclusion of an interior stator 38 mounted on the central core 34 to provide a greater electrical machine force per unit of translator moving mass. This significantly increases the dynamic performance of the actuator or LEM device acting on a working chamber. The interior stator 38 could be used in many different arrangements, for example with an upper interior fluid bearing and a lower exterior fluid bearing (or vice versa) and is not limited to the specific arrangement shown in FIG. 11.

Figure 12:
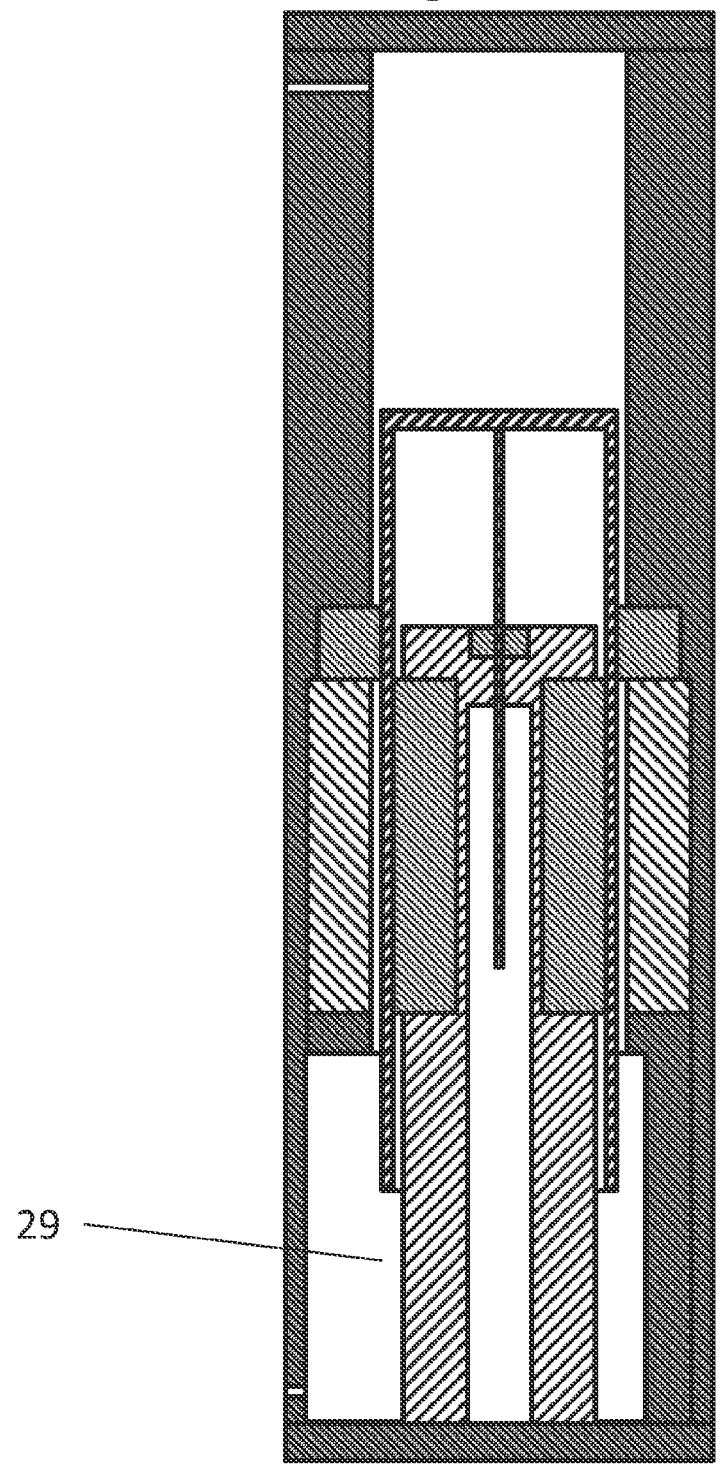
FIG. 12 is an axial section BB showing a further alternative arrangement with an asymmetric offset preload chamber.

FIG. 12 shows that the preload chamber 29 does not need to be a uniform shape, nor does the preload chamber itself need to be coaxial with the rest of the actuator. The asymmetric offset to the preload chamber 29 could be utilised in any of the arrangements in previous figures and may result in the preload chamber having a non-uniform cross section and/or a non-cylindrical side wall.

Figure 13:
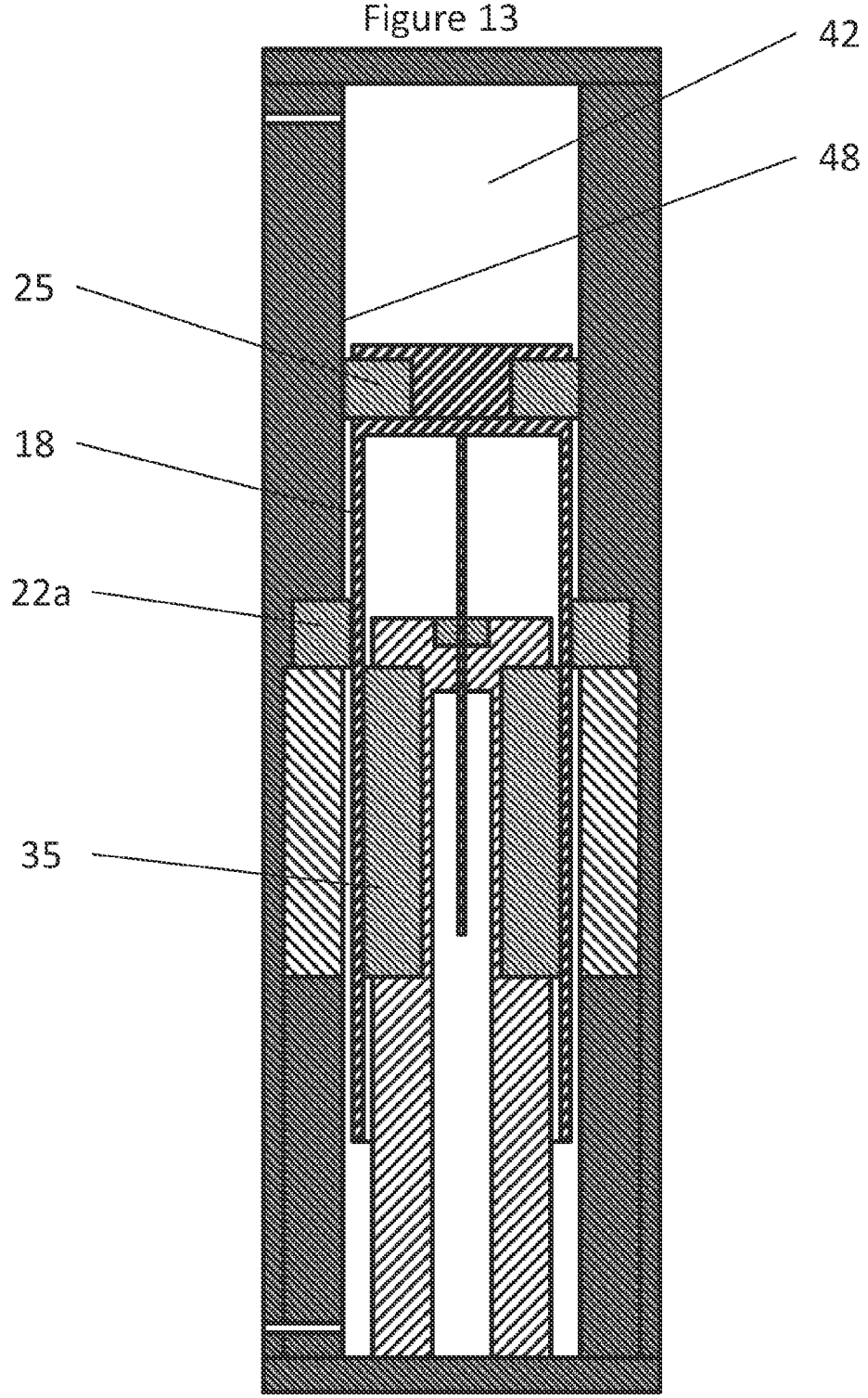
FIG. 13 is a perpendicular section BB showing a further alternative with central core, interior and exterior fluid bearings and translator fluid bearing.

FIG. 13 shows a further alternative configuration in which a further internal fluid bearing 25 is provided in the translator 18 itself. The translator bearing 25 is mounted on the translator and movable with the translator. A further bearing journal surface 48 is formed on the inner surface of the working chamber 42 and a bearing gap is formed between the journal surface 48 and the translator bearing 25.

Figure 14:
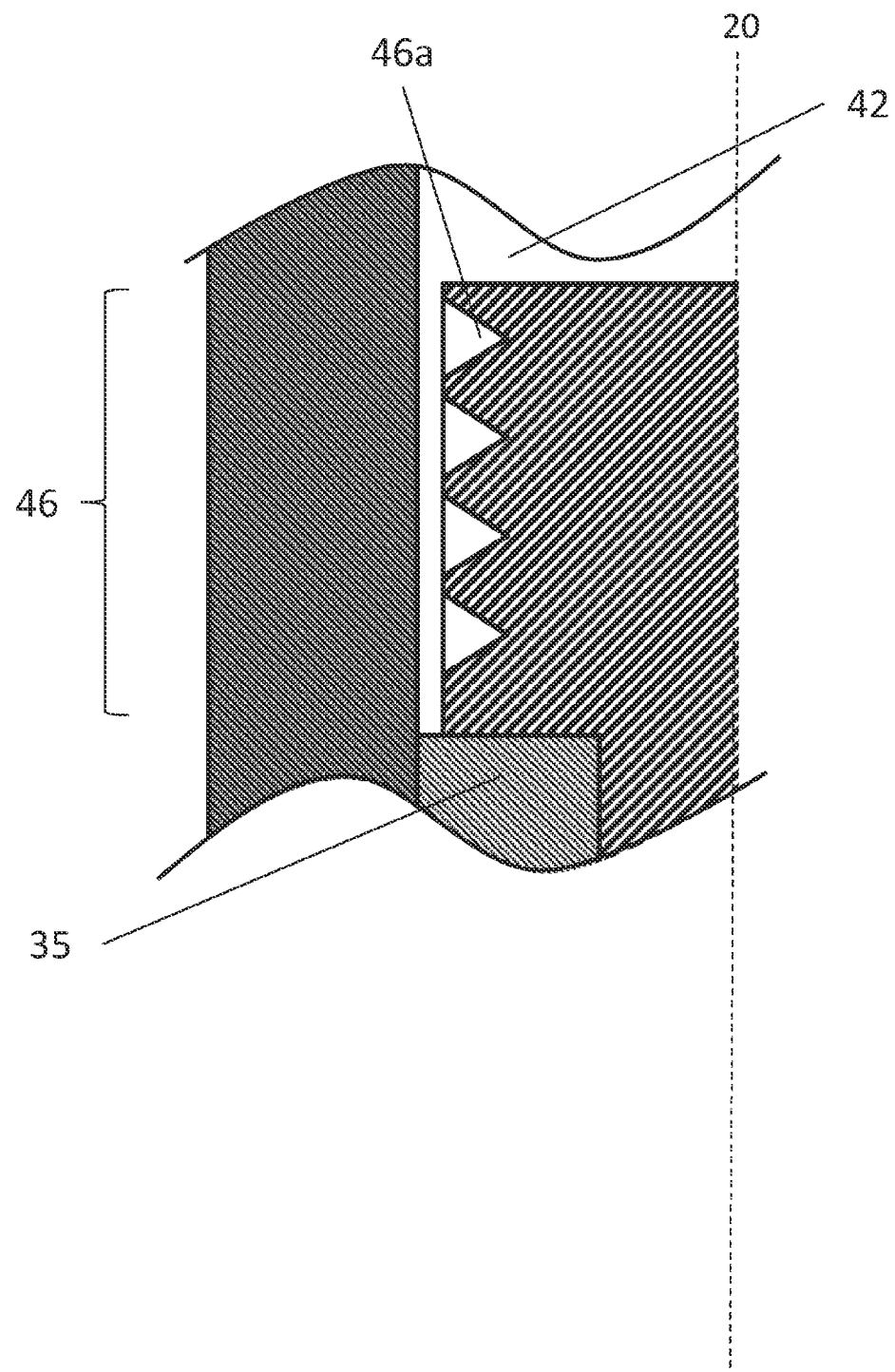
FIG. 14 is an enlarged view of perpendicular section BB showing an example embodiment of a labyrinth seal in detail.

FIG. 14 illustrates a labyrinth seal 46 in which the flow of fluid and the difference in pressure between the working chamber 42 and the fluid bearing 35 is controlled by provision of a series of annular channels 46a in the translator, A labyrinth seal is a non-contact seal that is commonly used in piston expander and compressor applications. The use of a labyrinth seal in the present invention eliminates the friction that would otherwise be associated with a contact seal, and also removes the requirement for a separate vent between the fluid bearing and the working chamber.

Figure 15:
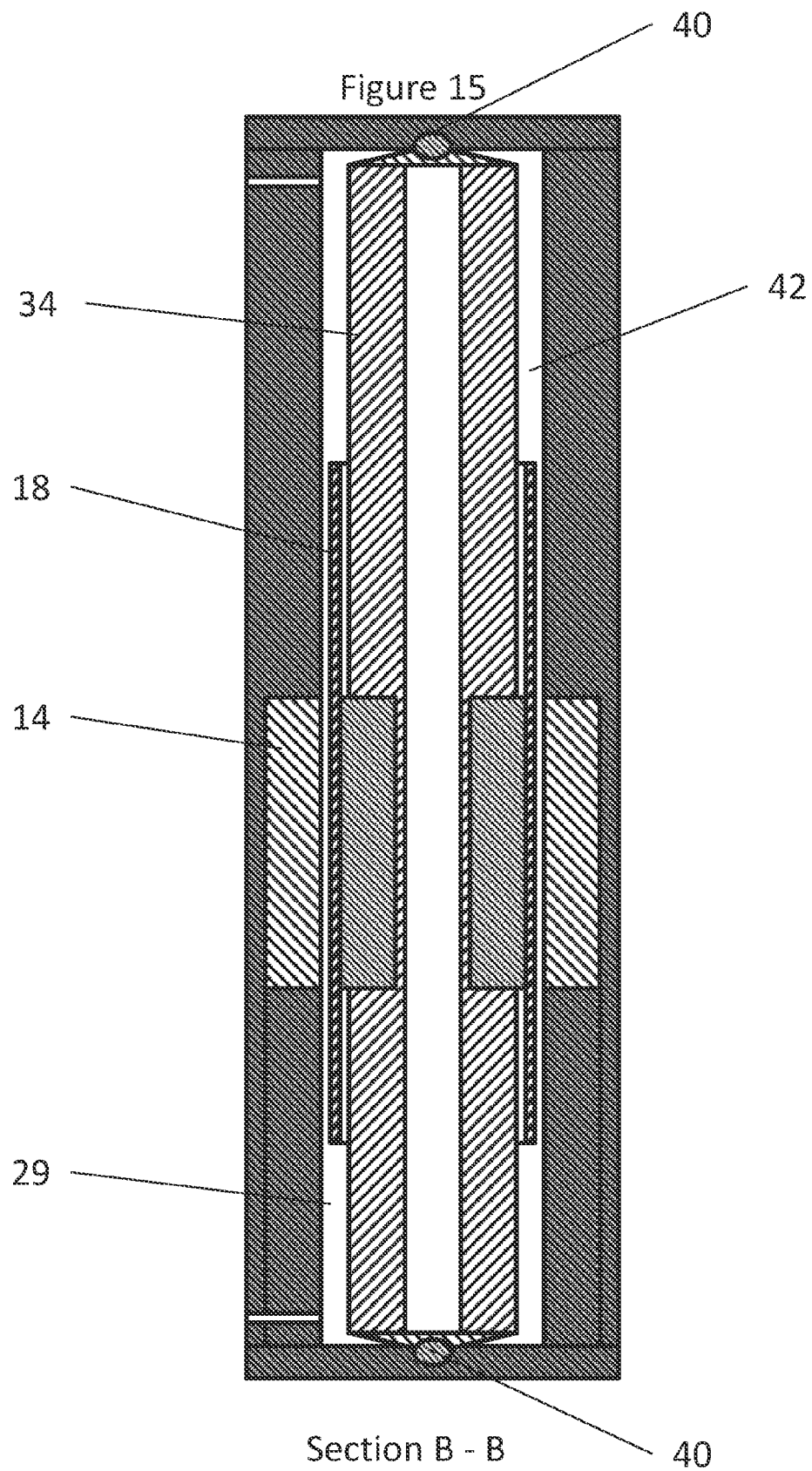
FIG. 15 is an axial section BB showing an alternative arrangement in which the central core passes through the translator.

FIG. 15 shows a further variant in which the central core 34 extends all the way through the translator 18, such that the translator is a hollow tube and is not closed at either end. The central core is fixed by fixing points 40 at both ends to the housing in order to maintain its radial position and axial within the LEM. The translator will, in use, slide up and down the central core. This arrangement provides a more secure fixing for the central core to reduce the extent of cantilever bending of the central core that might otherwise result in non-concentricity between the translator 19 and the stator 14. This arrangement permits the working chamber 42 and the preload chamber 29 to be equivalent in size and section area so that the preload chamber 29 could alternatively serve as a second working chamber. In addition, this arrangement reduces the area of the working chamber 42 that acts on the piston, and is therefore advantageous for high pressure working fluid applications. In such applications the force that applied by the working chamber pressure on end of the translator may otherwise exceed the capacity of the linear electrical machine and preload chamber to absorb the work applied by the working chamber over the course of a single stroke. Any of the previous bearing arrangements could be utilised in this variant.

Figure 17:
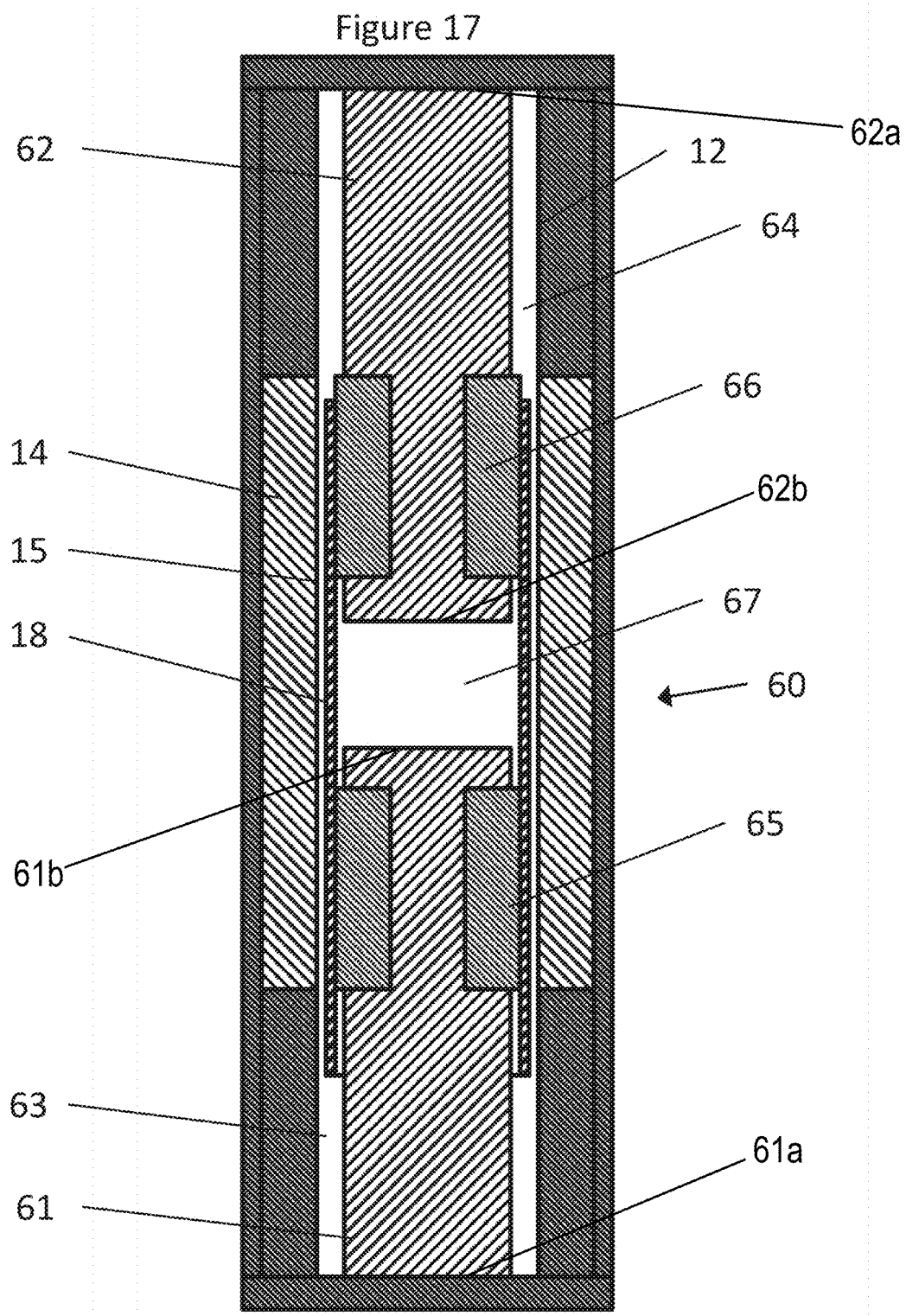
FIG. 17 is a perpendicular section through an LEM showing a first split/two section core arrangement.

FIG. 17 illustrates the simplest split core arrangement in an LEM 60. LEM 60 contains many of the same features as the embodiment of LEM 10 shown in FIG. 15 and these features are denoted by the same reference numerals.

In FIG. 17, a lower 61 and upper 62 central cores sections are provided. Each core section 61, 62 is cantilever mounted to a respective end of the housing 11 and therefore the core sections are opposed as they are directed towards each other. By this, we mean that each central core section is fixed in position (axially, laterally and rotationally) at an end 61a, 62a adjacent the respective end of the housing 11, with the other end 61b, 62b free. Each core section 61, 62 is provided with its own externally located bearing 65, 66 which acts on an inner portion of the hollow translator 18. The bearings are typically located adjacent a section of the stator 14, which in this example is a single stator.

The two core sections 61, 62 are co-axial and therefore, in a manner similar to that shown in FIG. 15, the translator is free to move along the entire length of the working cylinder by sliding over and along the bearings 65, 66. A central chamber 67, in this case having a fixed volume, is therefore defined by the translator and the free ends 61a, 62a of the two central core sections. The translator 18 defines, together with lower and upper parts of the housing 11, lower chamber 63 and upper chamber 64. One, or both, of these chambers may be working chambers, that is one in which force is generated (for example by combustion of a hydrocarbon) and applied to the translator, so as to induce motion and therefore generate a current in the coils of the stator.

In the example of FIG. 17, the translator 18 is a simple hollow, thin walled tube and is supported at all time by at least part of each of the bearing 65, 66. Thus, by splitting the central core into two sections, the arrangement of FIG. 17 permits the translator to move along the full length of the working cylinder, whilst being supported in two axial positions to help maintain appropriate and accurate alignment. Compared to the embodiment of LEM 10 shown in FIG. 15, the shorter central core sections of LEM 60 together provide the necessary support over the full length of the working cylinder whilst reducing the bending impact and the mechanical tolerance impact on the cantilever mounting of each core section. Thus, in this example, and in the other examples shown in FIGS. 18 to 20, a common working cylinder defined by the cylindrical housing wall 12 and the cylindrical stator bore(s) 15 contains two cantilever mounted central cores.

Figure 18:
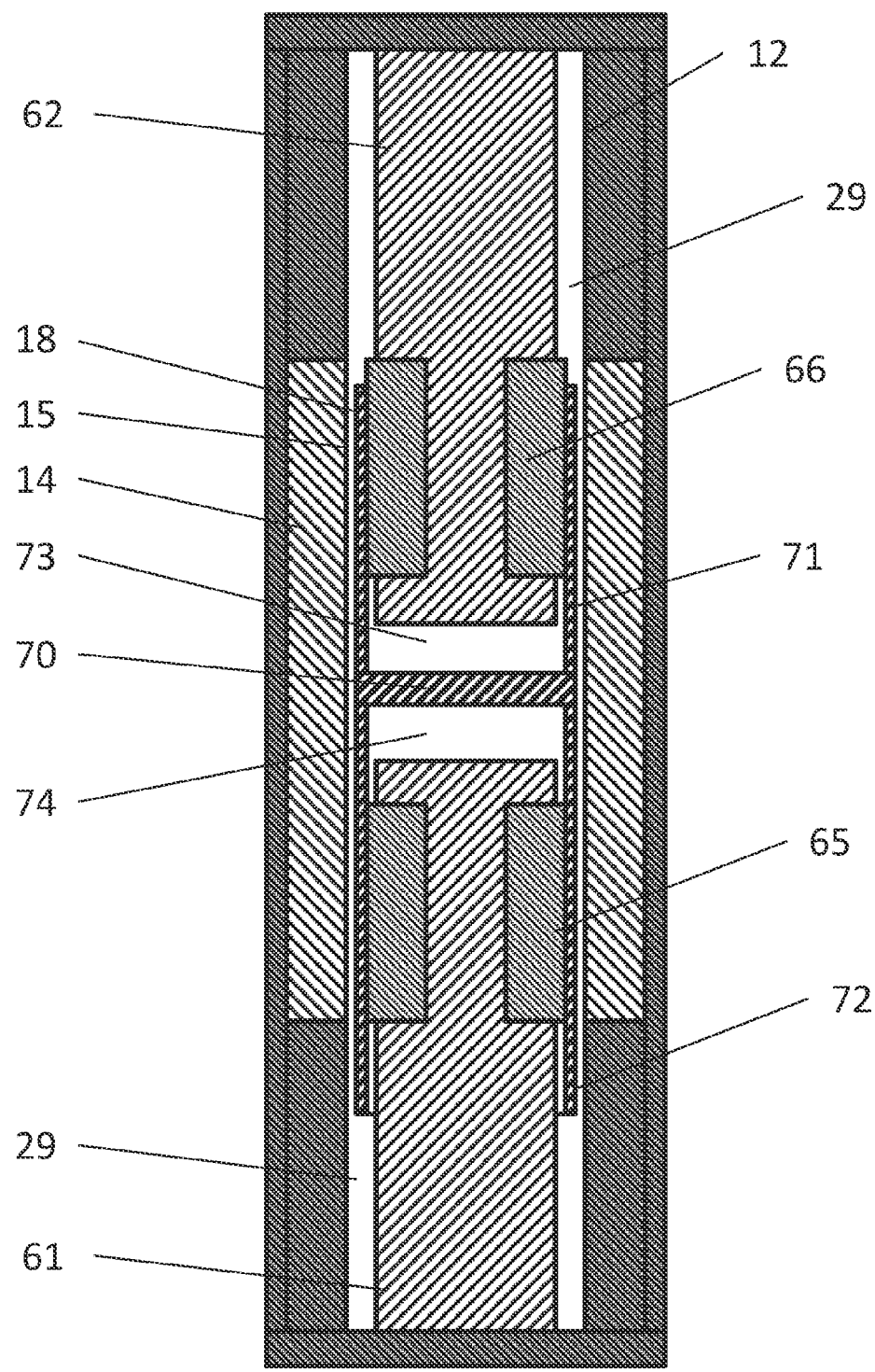
FIG. 18 is a perpendicular section through an LEM showing a second split/two section core arrangement.

FIG. 18 shows a slight modification to the arrangement of FIG. 17 in which the translator is provided with a central support 70, which acts as a force coupling feature, extending across the width of the translator which reciprocates with the translator between the two central core sections. In the simplest form, it may be a connecting rod or beam which acts to brace the translator and reduce any deformation of the central part of translator, for example by way of inward bending of the translator wall.

In the example shown in FIG. 18, the central support 70 takes the form of a solid wall thereby splitting the interior of the translator into upper 71 and lower 72 parts. Each translator part slides over its respective central core section and bearing, and defines a respective chamber 73, 74 between a surface of the central support, the radially outer wall of the translator and the end face of the respective central core section 62, 61. One, or both, of these chambers 73, 74 may be working chambers, that is one in which force is generated (for example by combustion of a hydrocarbon) and applied to the translator, so as to induce motion and therefore generate a current in the coils of the stator. One or both of chambers 29 may be preload or bounce chambers.

Figure 19:
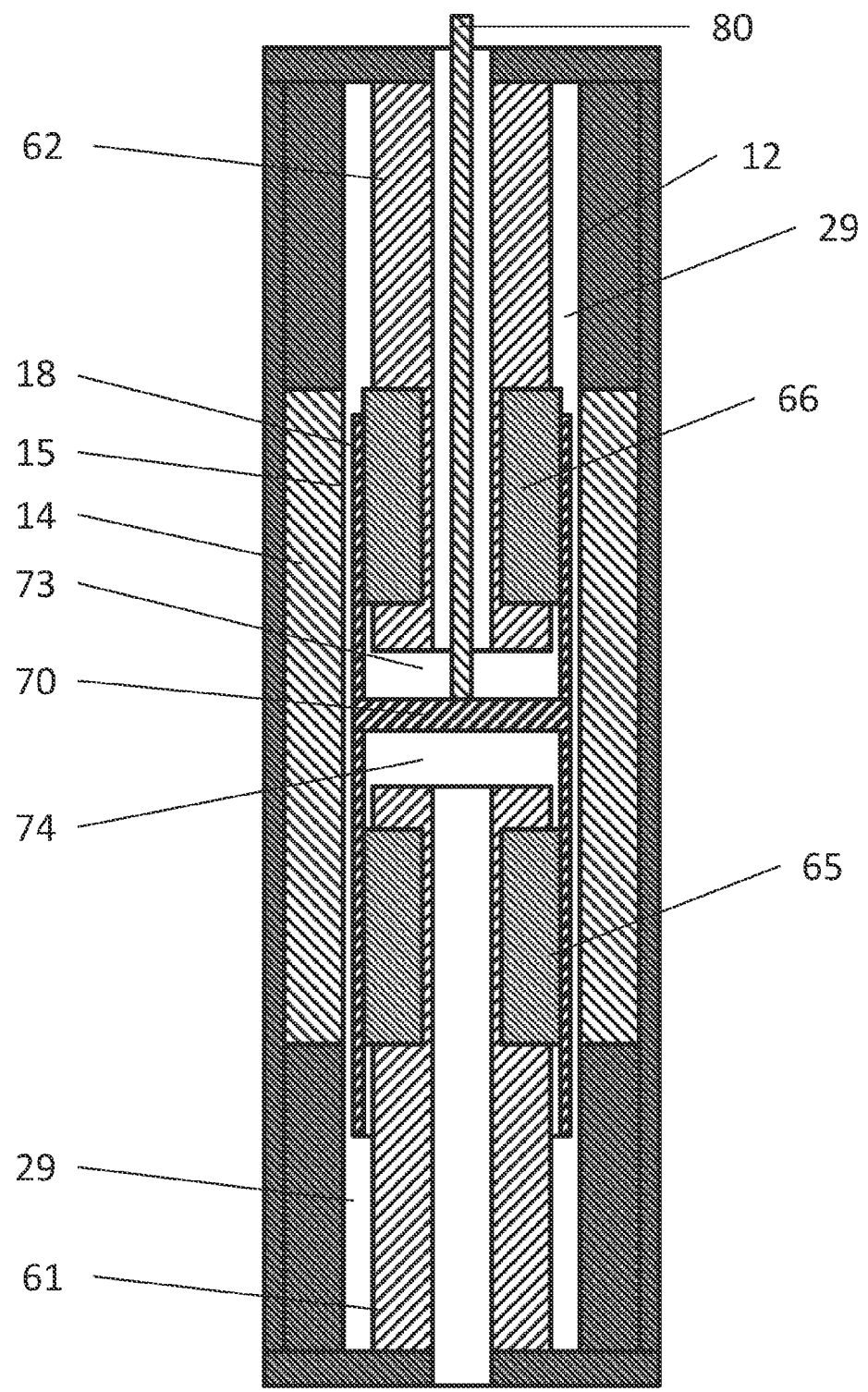
FIG. 19 is a perpendicular section through an LEM showing a third split/two section core arrangement.

A further example of the use of a two section central core is shown in FIG. 19. In this example, the upper central core 62 is hollow thereby allowing a force connecting rod 80 to be connected to the translator by way of the central support 70. The central support 70 could, in the version, take many different forms including a rod or beam extending across the translator, a solid wall as per FIG. 18 or may simply be one or more projections extending from the inner surface of the translator 18 on to which the force connecting rod 80 is mounted.

The force connecting rod, which is connected to the translator by way of the force coupling feature, may be used to apply a force to the translator 18, such that electrical current is generated in the stator 14. In an alternative arrangement, a flow of electrical current in the stator 14 may cause motion of the translator which in turn results in motion of the force connecting rod, thereby transmitting useful work out of the LEM. The chambers 29 may be bounce and/or preload chambers.

The lower central core 61 is also shown as hollow, but without a force connecting rod, although it is possible for each central core to include a respective force connecting rod.

Figure 20:
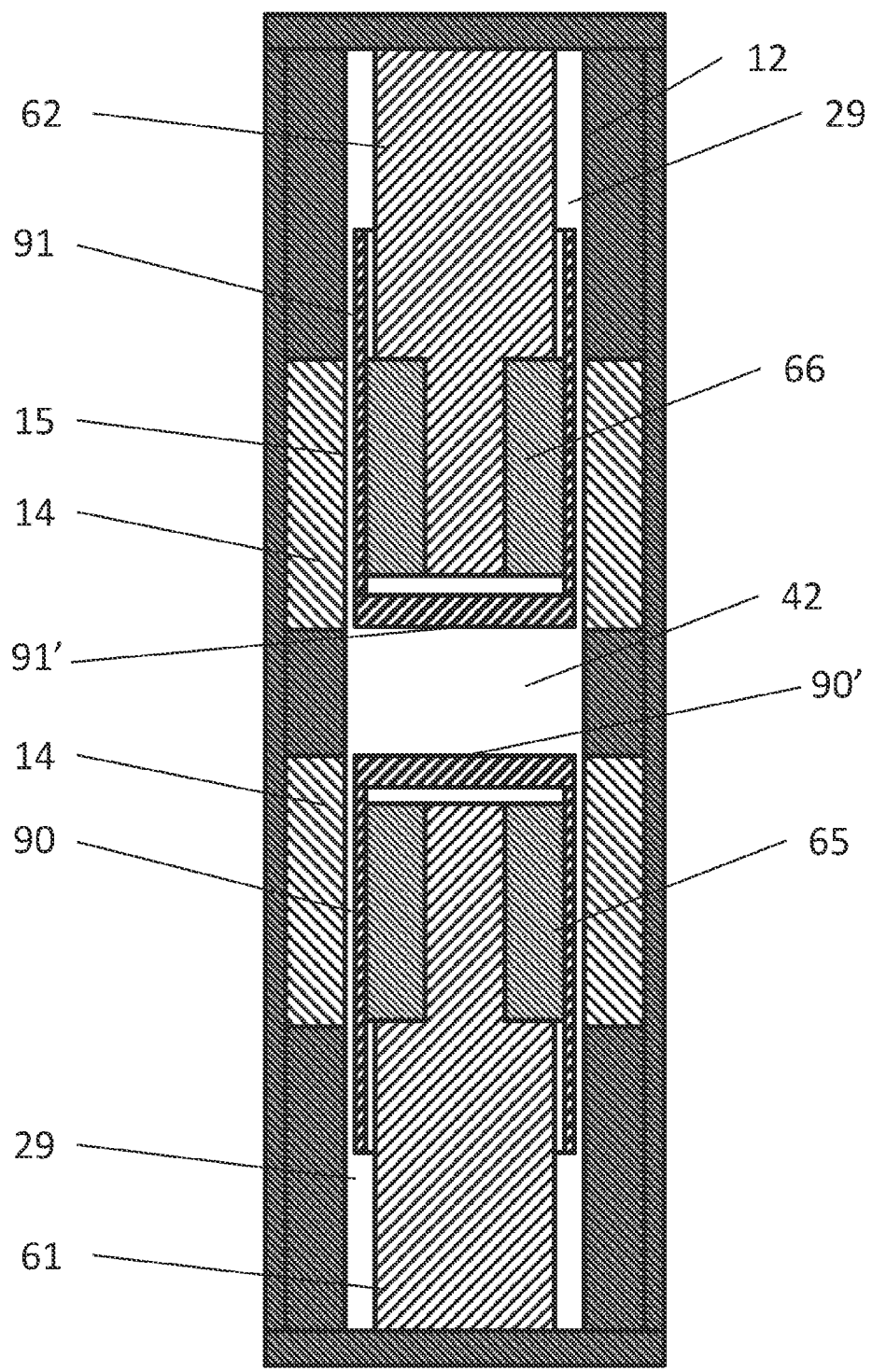
FIG. 20 is a perpendicular section through an LEM showing a fourth split/two section core arrangement.
Figure 21:
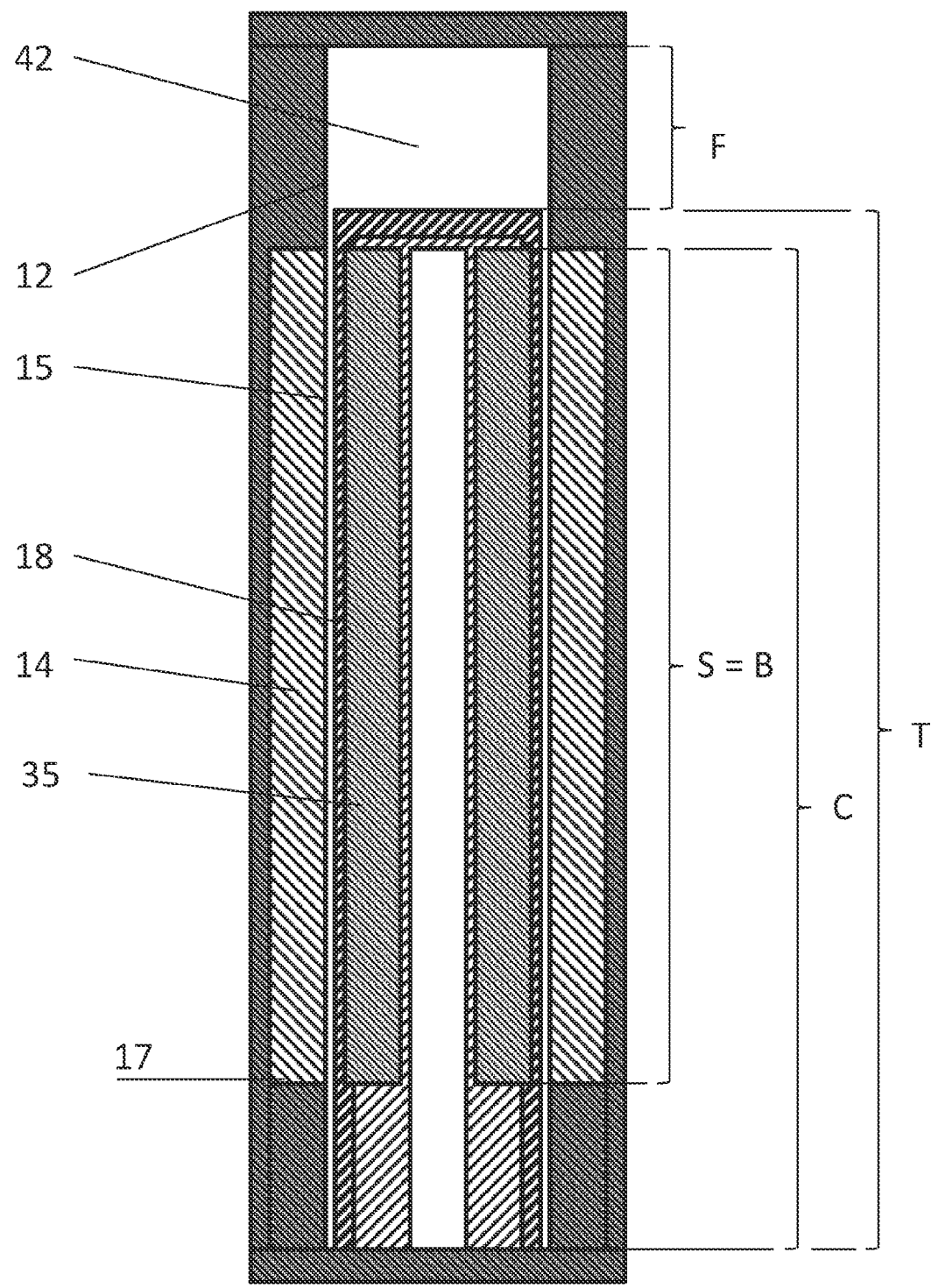
FIGS. 21 and 22 illustrate the five linear dimensions that characterise a linear electrical machine.
Figure 22:
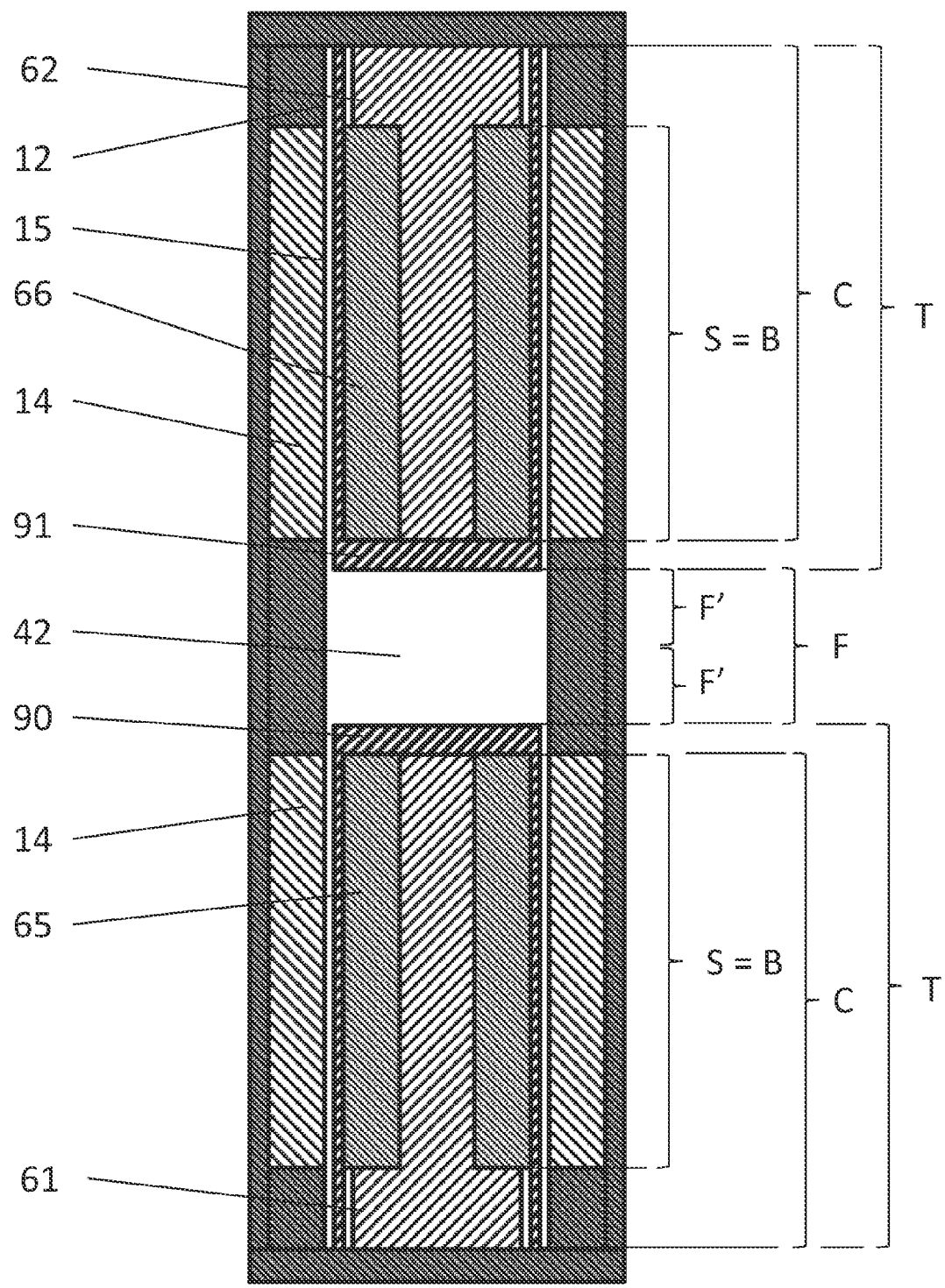

FIG. 20 illustrates a yet further example in which two translators 90, 91 are provided. Each translator 90, 91 moves over and along its own respective central core 61, 62, and bearing 65, 66 and past a respective stator 14. Stator 14 is shown in this example as being in two parts, but in principle it could be a single stator extending over both cores. The two part stator could be used in any of the previous examples. Each translator 90, 91 has a respective outer end face 90', 91' which together with the wall of the working cylinder define a central working chamber 42. This working chamber therefore acts on both end faces 90', 91' equally and at the same time, thereby driving each translator 90, 91 at the same time.

The working chamber 42 of FIG. 20 is shown having a similar diameter to that of the cylindrical stator bores 15. In an alternative embodiment the working chamber may have a smaller or larger diameter in relation to the cylindrical stator bores 15 and in this case the working cylinder 53 and translators 90, 91 could be stepped, each typically having a section of similar diameter to the stator bore 15 and another section having similar diameter to the working chamber 42.

The invention claimed is:

1. A linear electrical machine (LEM) comprising:
   at least one stator mounted in a housing, the housing and the at least one stator defining a working cylinder;
   a two-section central core within the working cylinder, wherein the two sections of the core are co-axial, separate and cantilever mounted within the working cylinder, wherein the central core is fixed at least axially relative to the stator within the working cylinder;
   a cylindrical stator bore cavity between the working cylinder and the two central core sections;
   one or more hollow cylindrical translators, each hollow cylindrical translator being axially movable within the stator bore cavity, such that each section of the central core is traversed by part of the one or more hollow cylindrical translators, thereby forming an exterior magnetic circuit airgap between respective translator and stator;
   one or more fluid bearings between a section of the central core and the one or more hollow cylindrical translators, wherein at least one of the fluid bearings is mounted on the central core and runs on a bearing surface formed on a part of an interior of the one or more hollow cylindrical translators; and
   one or more bearing journals provided on at least one internal surface of the one or more hollow cylindrical translators.

2. The linear electrical machine according to claim 1, wherein the core sections are opposed.

3. The linear electrical machine according to claim 2, wherein the core sections are directed towards each other.

4. The linear electrical machine according to claim 2, comprising two hollow cylindrical translators, such that first and second hollow cylindrical translators are movable over respective central core sections to form separate exterior magnetic circuit airgaps between the respective translator and the stator.

5. The linear electrical machine according to claim 4, wherein the two hollow cylindrical translators define a central chamber therebetween, such that the pressure within the chamber acts over the surfaces of the two hollow cylindrical translators.

6. The linear electrical machine according to claim 4, wherein the two hollow cylindrical translators are located in the same working cylinder.

7. The linear electrical machine according to claim 1, wherein each core section extends from an end of the housing towards the axial centre.

8. The linear electrical machine according to claim 1, wherein the one or more hollow cylindrical translators are movable over both core sections.

9. The linear electrical machine according to claim 1, wherein the one or more hollow cylindrical translators include at least one element projecting inwardly on a section of the hollow cylindrical translator that is free to reciprocate between the central cores.

10. The linear electrical machine according to claim 9, wherein the at least one projecting elements provides a force coupling feature.

11. The linear electrical machine according to claim 10, wherein the force coupling feature is a central support.

12. The linear electrical machine according to claim 11, wherein the central support is a solid wall.

13. The linear electrical machine according to claim 10, wherein the force coupling feature has no openings, thereby defining a pair of chambers between the force coupling feature and the free end of the respective central core sections, such that the pressure within each chamber acts over the surface of the force coupling feature.

14. The linear electrical machine according to claim 10, wherein at least one of the central core sections is hollow and a force connecting rod is connected to the interior of the one or more hollow cylindrical translators and extends through the hollow core section, the force connecting rod is connected to the force coupling feature.

15. The linear electrical machine according to claim 1, wherein at least one of the central core sections is hollow.

16. The linear electrical machine according to claim 15, wherein a force connecting rod is connected to the interior of the one or more hollow cylindrical translators and extends through the hollow core section.

17. The linear electrical machine according to claim 1, wherein the one or more fluid bearings are distributed throughout the length of the at least one stator.

18. The linear electrical machine according to claim 1, wherein the one or more bearing journals comprise a machined journal surface into at least one surface of the one or more hollow cylindrical translators.

19. The linear electrical machine according to claim 1, further comprising one or more external fluid bearings located on the cylindrical stator, wherein the one or more bearing journals are provided on an external surface of the one or more hollow cylindrical translators and the one or more external fluid bearings act upon the one or more bearing journals.

20. The linear electrical machine according to claim 1, further comprising a bearing gap formed between the one or more bearing journals and the one or more fluid bearings, wherein the bearing gap is smaller than the exterior magnetic circuit airgap.

21. The linear electrical machine according to claim 1, wherein the linear electrical machine is a slotted machine, the stator comprises magnetically permeable material, and further comprising:
- slots within the magnetically permeable material; and
- copper coils set into the slots within the magnetically permeable material;
- wherein the stator is configured for flux circuits carried by the magnetically permeable material and current flow in the copper coils.

* * * * *